(12) United States Patent
Nerurkar et al.

(10) Patent No.: US 10,467,234 B2
(45) Date of Patent: Nov. 5, 2019

(54) DIFFERENTIALLY PRIVATE DATABASE QUERIES INVOLVING RANK STATISTICS

(71) Applicant: LeapYear Technologies, Inc., Berkeley, CA (US)

(72) Inventors: Ishaan Nerurkar, Berkeley, CA (US); Christopher Hockenbrocht, Berkeley, CA (US); Liam Damewood, Walnut Creek, CA (US); Mihai Maruseac, Berkeley, CA (US); Alexander Rozenshteyn, Berkeley, CA (US)

(73) Assignee: LeapYear Technologies, Inc., Berkeley, CA (US)

( * ) Notice: Subject to any disclaimer, the term of this patent is extended or adjusted under 35 U.S.C. 154(b) by 0 days.

(21) Appl. No.: 16/040,478

(22) Filed: Jul. 19, 2018

(65) Prior Publication Data
US 2018/0349384 A1 Dec. 6, 2018

Related U.S. Application Data

(63) Continuation-in-part of application No. 15/203,797, filed on Jul. 7, 2016, now Pat. No. 10,192,069.
(Continued)

(51) Int. Cl.
*G06F 16/2457* (2019.01)
*G06F 21/62* (2013.01)
(Continued)

(52) U.S. Cl.
CPC ...... *G06F 16/24578* (2019.01); *G06F 16/248* (2019.01); *G06F 16/2465* (2019.01);
(Continued)

(58) Field of Classification Search
CPC ............. G06F 21/6227; G06F 21/6254; G06F 21/6245; G06F 16/24578; G06F 16/2465; G06F 16/248; G06F 17/18; G06N 20/00
See application file for complete search history.

(56) References Cited

U.S. PATENT DOCUMENTS

| 6,546,389 B1 | 4/2003 | Agrawal et al. |
| 7,219,237 B1 | 5/2007 | Trimberger |
| (Continued) | | |

FOREIGN PATENT DOCUMENTS

| WO | WO 2015/090445 A1 | 6/2015 |
| WO | WO 2015/157020 A1 | 10/2015 |
| WO | WO 2017/187207 A1 | 11/2017 |

OTHER PUBLICATIONS

Shang S, Wang T, Cuff P, Kulkarni S. The Application of Differential Privacy for Rank Aggregation: Privacy and Accuracy. In 17th International Conference on Information Fusion (FUSION), Jul. 7, 2014 (pp. 1-7). (Year: 2014).*
(Continued)

*Primary Examiner* — Robert B Leung
(74) *Attorney, Agent, or Firm* — Fenwick & West LLP

(57) ABSTRACT

A differentially private security system is communicatively coupled to a database. The differentially private security system receives a request from a client device to perform a query of the database and identifies a level of differential privacy corresponding to the request. The identified level of differential privacy includes privacy parameters $(\varepsilon, \delta)$ indicating the degree of information released about the database. The differentially private security system performs a differentially private query upon a set of data in the database such that the performance of the query produces a result that is $(\varepsilon, \delta)$-differentially private.

19 Claims, 16 Drawing Sheets

Related U.S. Application Data

(60) Provisional application No. 62/249,938, filed on Nov. 2, 2015.

(51) Int. Cl.
    *G06F 17/18* (2006.01)
    *G06F 16/2458* (2019.01)
    *G06F 16/248* (2019.01)
    *G06N 20/00* (2019.01)

(52) U.S. Cl.
    CPC .......... *G06F 17/18* (2013.01); *G06F 21/6227* (2013.01); *G06F 21/6245* (2013.01); *G06F 21/6254* (2013.01); *G06N 20/00* (2019.01)

(56) References Cited

U.S. PATENT DOCUMENTS

| | | | |
|---|---|---|---|
| 7,698,250 | B2 | 4/2010 | Dwork et al. |
| 2005/0278786 | A1 | 12/2005 | Tippett et al. |
| 2006/0161527 | A1 | 7/2006 | Dwork et al. |
| 2006/0200431 | A1 | 9/2006 | Dwork et al. |
| 2007/0136027 | A1* | 6/2007 | Dwork ................ G06F 16/2458 702/180 |
| 2007/0143289 | A1 | 6/2007 | Dwork et al. |
| 2007/0239982 | A1 | 10/2007 | Aggarwal et al. |
| 2009/0327228 | A1 | 12/2009 | Krause et al. |
| 2011/0064221 | A1 | 3/2011 | McSherry et al. |
| 2011/0078143 | A1 | 3/2011 | Aggarwal |
| 2011/0131222 | A1 | 6/2011 | DiCrescenzo |
| 2011/0208763 | A1 | 8/2011 | McSherry et al. |
| 2011/0282865 | A1 | 11/2011 | Talwar et al. |
| 2012/0143922 | A1 | 6/2012 | Rane et al. |
| 2012/0197864 | A1 | 8/2012 | Bourdoncle et al. |
| 2014/0281572 | A1 | 9/2014 | Wang et al. |
| 2014/0283091 | A1 | 9/2014 | Zhang et al. |
| 2015/0235051 | A1 | 8/2015 | Fawaz et al. |
| 2015/0286827 | A1 | 10/2015 | Fawaz et al. |
| 2015/0293923 | A1 | 10/2015 | Eide et al. |
| 2016/0283738 | A1 | 9/2016 | Wang et al. |
| 2016/0335455 | A1 | 11/2016 | Mohan et al. |
| 2017/0126694 | A1 | 5/2017 | Nerurkar et al. |
| 2017/0169253 | A1 | 6/2017 | Curcio et al. |

OTHER PUBLICATIONS

Xu J, Zhang Z, Xiao X, Yang Y, Yu G, Winslett M. Differentially Private Histogram Publication. In 2012 IEEE 28th International Conference on Data Engineering, Apr. 2012. IEEE. (Year: 2012).*

Dankar, F. et al., "Practicing Differential Privacy in Health Care: A Review," Transactions on Data Privacy, 2013, vol. 5, pp. 35-67.

Extended European Search Report and Written Opinion, European Application No. 16862625.7, dated Mar. 27, 2019, 9 pages.

Frades, M.R., "Overview on Techniques in Cluster Analysis," in Bioinformatics in Clinical Research, Methods in Molecular Biology (Methods and Protocols), 2010, vol. 593, pp. 81-107.

Fraley, C., et al., "How Many Clusters? Which Clustering Method? Answers Via Model-Based Cluster Analysis," The Computer Journal, 1998, vol. 41, No. 8, pp. 578-588.

Kellaris, G. et al., "Practical differential privacy via grouping and smoothing," Proceedings of the VLDB Endowment, Mar. 1, 2013, vol. 6, No. 5, pp. 301-312.

PCT International Search Report and Written Opinion, PCT Application No. PCT/US19/15035, dated Jun. 20, 2019, 14 pages.

Chaudhuri, K. et al., "Privacy-preserving logistic regression," Advances in Neural Information Processing Systems, 2009, pp. 289-296.

Zhang, J. et al., "Functional Mechanism: Regression Analysis under Differential Privacy," Proceedings of the VLDB Endowment, 2012, vol. 5, No. 11, pp. 1364-1375.

Agrawal, R. et al., "Privacy-Preserving Data Mining," ACM SIGMOD, May 2000, pp. 439-450.

Bost, R. et al. "Machine Learning Classification over Encrypted Data". NDSS '15, Feb. 8-11, 2015, pp. 1-14.

Dwork, C. et al., "Differential Privacy and Robust Statistics," Proceedings of the Forty-First Annual ACM Symposium on Theory of Computing, Nov. 14, 2008, 42 pages, [Online] [Retrieved on Sep. 15, 2016], Retrieved from the Internet<URL:http://www.stat.cmu.edu/~jingle/dprs_stoc09.pdf>.

Dwork, C. "Differential Privacy: A Survey of Results," TAMC 2008, LNCS 4978, Agrawal, M. et al. (eds.), pp. 1-19.

Dwork, C., "A Firm Foundation for Private Data Analysis," Proceedings of the ACM, Jan. 2011, 8 pages, vol. 54, Issue 1.

Dwork, C. et al., "Calibrating Noise to Sensitivity in Private Data Analysis," Proceedings of the Third Conference on Theory of Cryptography, New York, NY, Mar. 4-7, 2006, pp. 265-284.

Friedman, A. et al., "Data Mining with Differential Privacy, Proceedings of the 16$^{th}$ ACM SIGKDD International Conference on Knowledge Discovery and Data Mining," Dec. 2010, 11 pages, [Online] [Retrieved on Sep. 13, 2016], Retrieved from the Internet<URL:http://users.cis.flu.edu/~lzhen001/activities/KDD_USB_key_2010/docs/p493.pdf>.

Huang, Y. et al., "Telco Churn Prediction with Big Data," Proceedings of the 2015 ACM SIGMOD International Conference on Management of Data, Jun. 4, 2015, 13 pages, [Online] [Retrieved on Sep. 13, 2016], Retrieved from the Internet<URL:http://users.wpi.edu/~yli15/Includes/SIGMOD15Telco.pdf>.

Jagannathan, G. et al., "A Practical Differentially Private Random Decision Tree Classifier," International Conference on Data Mining Workshops, Proceedings of the ICDM International Workshop on the Privacy Aspects of Data Mining, 2009, pp. 114-121.

Ji, Z. et al., "Differential Privacy and Machine Learning: a Survey and Review," Cornell University Library—arXiv preprint, Dec. 24, 2014, 32 pages, [Online] [Retrieved on Sep. 14, 2016], Retrieved from the Internet<URL:http://arxiv.org/pdf/1412.7584.pdf>.

Nissim, K. et al., "Smooth Sensitivity and Sampling in Private Data Analysis," Proceedings of the Thirty-Ninth Annual ACM Symposium on Theory of Computing, Jun. 13, 2007, 11 pages, [Online] [Retrieved on Sep. 14, 2016], Retrieved from the Internet<URL:http://www.cse.psu.edu/~sxr48/pubs/smooth-sensitiviy-stoc.pdf>.

Patil, A. et al., "Differential Private Random Forest," International Conference on Advances in Computing, Communications and Informatics, Sep. 27, 2014, 10 pages, [Online] [Retrieved on Sep. 14, 2016], Retrieved from the Internet<URL:http://ieeexplore.ieee.org/stamp/stamp.jsp?tp-&arnumber=6968348&isnumber=6968191>.

PCT International Search Report and Written Opinion, PCT Application No. PCT/US16/44178, dated Oct. 18, 2016, 20 pages.

Peng, S. et al., "Query Optimization for Differentially Private Data Management Systems", ICDE Conference 2013, pp. 1093-1104.

Xiao, X. et al., "iReduct: Differential Privacy with Reduced Relative Errors", SIGMOD' 11, Jun. 12-16, 2011, pp. 229-240.

Zhang, N. et al., "Distributed Data Mining with Differential Privacy", IEEE ICC 2011 proceedings.

United States Office Action, U.S. Appl. No. 15/793,898, dated Feb. 7, 2018, 11 pages.

United States Office Action, U.S. Appl. No. 15/793,898, dated May 15, 2018, 14 pages.

United States Office Action, U.S. Appl. No. 15/793,907, dated Jan. 31, 2018, 11 pages.

United States Office Action, U.S. Appl. No. 15/793,907, dated May 15, 2018, 14 pages.

United States Office Action, U.S. Appl. No. 15/203,797, dated Jun. 8, 2018, 13 pages.

United States Office Action, U.S. Appl. No. 15/203,797, dated Jan. 17, 2018, 13 pages.

* cited by examiner

| Entry # | Feature 1 (cm) | Feature 2 (residence) |
|---|---|---|
| 1 | 163 | Italy |
| 2 | 136 | England |
| 3 | 180 | France |
| 4 | 347 | USA |
| 5 | 388 | China |
| 6 | 145 | France |
| 7 | 169 | Korea |
| 8 | 158 | USA |

| Feature 10 (age) | Feature 11 (Disease) |
|---|---|
| 37 | 0 |
| 87 | 0 |
| 54 | 1 |
| 34 | 0 |
| 18 | 0 |
| 13 | 1 |
| 65 | 1 |
| 17 | 1 |

DIFFERENTIALLY PRIVATE DATABASE QUERIES INVOLVING RANK STATISTICS

CROSS-REFERENCE TO RELATED APPLICATIONS

This application is a continuation-in-part of application Ser. No. 15/203,797, filed Jul. 7, 2016, which claims the benefit of Provisional Application No. 62/249,938, filed Nov. 2, 2015, all of which are incorporated by reference herein.

BACKGROUND

Field of Disclosure

The present invention generally relates to computer databases, and more specifically relates to techniques for executing queries on computer databases producing results in response to the queries.

Description of the Related Art

Data about people, such as health data, financial records, location information, web browsing and viewing habits, is valuable for analysis and collaboration. There are many technologies in which statistical or predictive analysis of personal data is beneficial. For example, medical research institutions use medical information about populations of individuals to support epidemiologic studies. Financial institutions use financial records to detect fraud. Map providers use location information gathered from mobile devices carried by people to determine traffic information and provide routing guidance. Technology companies collect information describing behaviors of Internet users to improve their offerings, such as by redesigning user interfaces to improve human-computer interactions, making improved recommendations, and offering sponsored messages.

However, use of personal data is often restricted by legal and societal concerns. Governments have laws and/or regulations about how personal data can be collected, used, and shared. Individuals likewise have expectations about how their personal data will be protected, and may react negatively if their data is publicly disclosed. As a result, companies that collect and maintain these types of restricted data seek ways to extract value from the data while respecting the restrictions placed on it.

One set of techniques for using restricted data involves limiting access to the raw data contained in a database. Access controls may be used to restrict database access to only individuals having appropriate credentials. Another set of techniques involves removing personally-identifiable information from the data through masking, hashing, anonymization, aggregation, and tokenization. These techniques tend to be resource intensive and may compromise analytical utility. For example, data masking may remove or distort data, compromising the statistical properties of the data.

An additional technique makes use of differential privacy. Differential privacy is technology that injects noise into data released from a database in order to protect restricted information contained therein. As with other techniques, enforcing differential privacy on a database of restricted data can compromise the analytical utility of the data. Some analytic techniques may lack differentially private implementations, meaning that analysts must make do without those particular techniques when working with restricted data. Even when differentially private implementations of analysis techniques are available, the mechanisms that enforce differential privacy may render the technique unsuitable for its intended purpose. For example, a differentially private analysis technique might lack fine-grained control required to extract maximum utility from the restricted data.

SUMMARY

A differentially private security system is communicatively coupled to a database. The differentially private security system receives a request from a client device to perform a query of the database and identifies a level of differential privacy corresponding to the request. The identified level of differential privacy includes a privacy parameter $\varepsilon$ indicating the degree of information released about the database by performance of the query.

The differentially private security system identifies a set of data in the database to perform the query upon. The differentially private security system performs a differentially private version of the query upon the set of data in the database such that the performance of the differentially private query produces a result that is $(\varepsilon,\delta)$-differentially private. The differentially private result is returned to the client device.

BRIEF DESCRIPTION OF DRAWINGS

FIG. 2 illustrates an example database structure, according to one embodiment.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality.

System Overview

Figure 1:
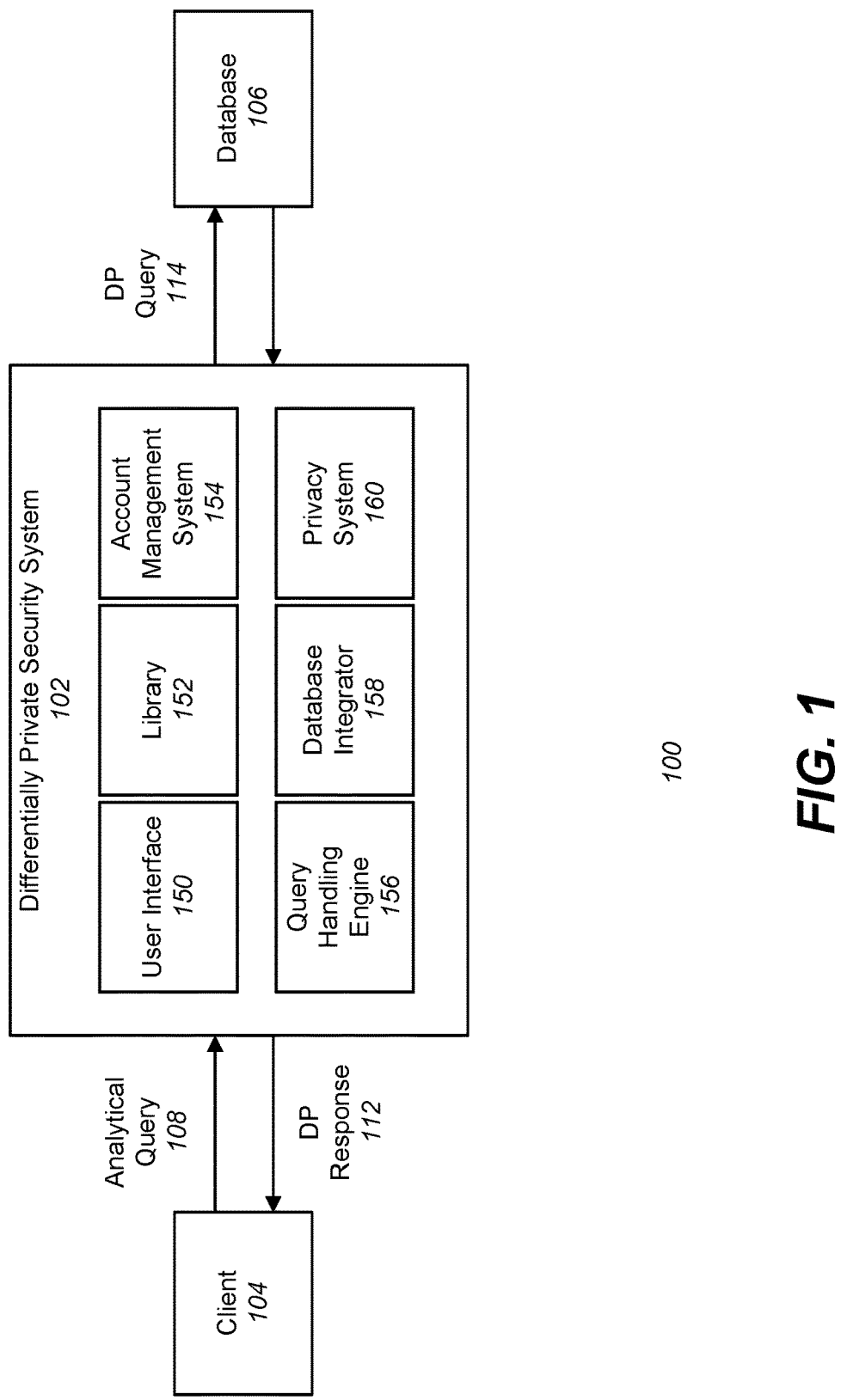
FIG. 1 illustrates a system for receiving a database query, and for executing the query on the database in a differentially private manner.

FIG. 1 is a system 100 for receiving a query 108 for a database 106, and responding to the query 108 by executing the query in a differentially private (DP) manner. The system 100 includes a differentially private security system 102 that receives the analytical query 108 from a client 104 and applies a DP version of the query 114 on the database 106. Subsequently, the differentially private security system 102 returns the response of the DP query 114 to the client 104 as the DP response 112.

The database 106 is one or more databases managed by one or more entities. The database 106 may be managed by the same entity that manages the differentially private security system 102 or by a different entity. The database 106 stores at least some restricted data. The restricted data may be represented as rows of records, with each record having a set of columns holding values pertaining to the record.

Restricted data is data to which access and/or usage is limited due to legal, contractual, and/or societal concerns. Examples of restricted data include health data of patients and financial records of people, businesses or other entities. Similarly, restricted data may include census data or other forms of demographic data describing people, businesses, or other entities within geographic areas. Restricted data also includes usage data describing how people interact with electronic devices and/or network-based services. For example, restricted data may include location data describing geographic movements of mobile devices, consumption history data describing how and when people consume network-based content, and the particular content consumed (e.g., music and/or video content), and messaging data describing when and to whom users send messages via mobile or other electronic devices.

A client 104 is used to access the restricted data in the database 106. A client 104 is an electronic device such as a desktop, laptop, or tablet computer or a smartphone used by a human user to access the database 106. The client 104 and user may be, but are not necessarily, associated with the entities that manage the database 106 and/or differentially private security system 102. Users of the client 104 include administrators and analysts. Administrators use the clients 104 to access the differentially private security system 102 and/or database 106 to perform administrative functions such as provisioning other users and/or clients 104, and configuring, maintaining, and auditing usage of the system and/or database. The administrators may access the differentially private security system 102 and database 106 directly via administrative interfaces that allow users with appropriate credentials and access rights to perform the administrative functions.

Analysts use the clients 104 to apply analytical queries 108 to the restricted data in the database 106. The clients 104 used by the analysts access the database 106 only through the differentially private security system 102. Depending upon the embodiment, the analyst and/or client 104 may have an account provisioned by an administrator which grants the analyst or client certain rights to access the restricted data in the database 106.

The rights to the restricted data may be specified in terms of a privacy budget. The privacy budget describes limits on how much of the restricted data can be released. The privacy budget may be specified in terms of a query, analyst, client 104, entity, globally, and/or time period. For example, the privacy budget may specify limits for an individual query, with each query having a separate budget. The privacy budget may also specify limits for an analyst or client, in which case the budget is calculated cumulatively across multiple queries from a client or analyst. For a privacy budget specified for an entity, such as an organization having multiple clients 104 and users, the privacy budget is calculated cumulatively across the multiple queries from clients and users associated with the entity. A global privacy budget, in turn, is calculated across all queries to the database, regardless of the source of the query. The privacy budget may also specify an applicable time period. For example, the privacy budget may specify that queries from particular sources (e.g., analysts, entities) may not exceed a specified budget within a given time period, and the budget may reset upon expiration of the time period. The privacy budget is a numerical value representative of a number and/or type of remaining queries 108 available to the client 104 in terms of the privacy parameters specified for each query 108.

As discussed above, a client 104 sends an analytical query 108 to the differentially private security system 102 and also receives a differentially private response 112 to the query from the system. The queries 108 submitted by the client 104 may be simple queries, such as count queries that request the number of entries in the databases 106 that satisfy a condition specified by the client 104, or complicated queries, such as predictive analytics queries that request a data analytics model trained on the databases 106. Specific types of queries are discussed in more detail below.

Each query has an associated set of privacy parameters. The privacy parameters indicate the amount of restricted data to release from the database 106 to the client 104 in response to the query 108. The privacy parameters likewise indicate the amount of decrease in the relevant privacy budget (e.g., the budget for the client 104 or entity with which the client is associated) in response to the query 108. In one embodiment, the client 104 specifies a set of associated privacy parameters with each submitted query 108. In other embodiments, the privacy parameters are specified in other ways. The differentially private security system 102 may associate privacy parameters with received queries (rather than obtaining the parameters directly from the query). For example, the differentially private security system 102 may apply a default set of privacy parameters to queries that do not specify the parameters. The values of the default privacy parameters may be determined based on the client 104, analyst, query type, and/or other factors.

The differentially private security system 102 receives an analytical query 108 from the client 104 and returns a differentially private response 112 to the client. In one embodiment, the differentially private security system 102 determines the privacy parameters associated with the query, and evaluates the parameters against the applicable privacy budget. If the analytical query 108 and associated privacy parameters exceeds the privacy budget, the differentially private security system 102 may deny (i.e., not execute) the query. Alternatively, the differentially private security system 102 may adjust the privacy parameters to fall within the privacy budget, and execute the query using the adjusted privacy parameters. If the privacy parameters do not exceed the privacy budget, the differentially private security system 102 executes a DP version of the query 114 on the database 106, such that it releases a degree of restricted data from the database 106 indicated by the privacy parameters specified by the client 104, and also protects a degree of privacy of the restricted data specified by the privacy budget. For example, an administrator of the database 106 may set a privacy budget specifying a maximum threshold on the amount of restricted data released by given query 108 that the client 104 may not exceed. Thus, the differentially private security system 102 balances privacy protection of the restricted data in the database 106 while releasing useful information on the database 106 to the client 104.

The DP query 114 applied to the database 106 by the differentially private security system 102 is a differentially private version of the query 108 that satisfies a definition of differential privacy described in more detail with reference to the privacy system 160 in FIG. 3. The differentially private security system 102 may apply the DP query 114 to the database 106 by transforming the analytical query 108 into one or more queries derived from the analytical query that cause the database 106 to release differentially private results. The differentially private security system 102 may then return these differentially private results to the client as the DP response 112. The differentially private security system 102 may also, or instead, apply the DP query 114 to the database 106 by transforming the analytical query into one or more derived queries that cause the database to release results that are not necessarily differentially private. The differentially private security system 102 may then transform the released results in a way that enforces differential privacy to produce the DP response 112 returned to the client 104. These transformations may involve perturbing the process by which the DP query 114 is produced from the analytical query 108 and/or the perturbing the results released by the database 106 with noise that provides the differential privacy specified by the privacy parameters while enforcing the privacy budget.

The differentially private security system 102 allows an analyst to perform database queries on restricted data, and thereby perform analyses using the DP responses 112 returned by the queries, while maintaining adherence with privacy parameters and a privacy budget. In addition, the techniques used by the differentially private security system 102 allow database queries to access restricted data in ways that do not compromise the analytical utility of the data. The differentially private security system 102 supports a wide variety of analytical and database access techniques, described in more detail below, and provides fine-grained control of the privacy parameters and privacy budget when using such techniques. The differentially private security system 102 thus provides an improved database system having expanded and enhanced access to restricted data relative to other database systems.

An analyst can use the differentially private security system 102 for a variety of different purposes. In one embodiment, the restricted data in the database 106 includes training data describing features of entities relevant to a particular condition. The analyst uses the differentially private security system 102 to build one or more differentially private machine-learned models, such as classifiers, from the training data. The analyst can apply data describing a new entity to the machine-learned models, and use the outputs of the models to classify the new entity as having, or not having the condition. However, an adversary cannot use the information in the machined-learned models to ascertain whether individual entities described by the training set have the condition due to the differentially private nature of the models.

Such models may be retained and executed within the differentially private security system 102. For example, an analyst can issue an analytical query 108 that causes the differentially private security system 102 to interact with the restricted data in the database 106 to build the machine-learned models. The differentially private security system 102 can then store the models within the system or an associated system. The analyst can use a new analytical query 108 or another interface to the system 102 to apply the data describing the new entity to the models. The differentially private security system 102 can execute the new data on the stored models and output the classification of the entity as a DP response 112. Alternatively or in addition, the differentially private security system 102 can output the trained models as a DP response 112, and an analyst can store and apply data to the models using different systems in order to classify the entity.

Examples of the types of classifications that may be performed using such models include determining whether a person (the entity) has a medical condition. In this example, the restricted training data include health data describing patients that are labeled as having or not having a given medical condition. The analyst applies health data for a new patient to the one or more differentially private machine-learned models generated from the restricted training data in order to diagnose whether the new patient has the medical condition.

Another example classification that may be performed using such models involves identifying fraudulent or otherwise exceptional financial transactions. In this example, the restricted training data includes financial transaction data associated with one or more people or institutions, where the transactions are labeled as being exceptional or not exceptional. The analyst applies financial transaction data for a new transaction to the one or more differentially private machine-learned models generated from the restricted training data in order to determine whether the new transaction is exceptional. The analyst can block, flag, or otherwise report an exceptional transaction.

Another purpose for which an analyst can use the differentially private security system 102 is data exploration involving rank statistics. Rank statistics involves a data transformation in which numerical or ordinal values are replaced by rank when the data are sorted. Data records in the database 106 that contain the restricted data can be ranked based on the values in one or more particular fields (e.g., columns). The ranking is then exploited to determine the value of particular quantiles such as the median and percentiles (e.g., top 10%). For example, an analyst can issue an analytical query 108 that causes the differentially private security system 102 to interact with the restricted data in the database 106 to calculate and return one or more DP responses 112 including rank statistics derived from the data. Because the differentially private security system 102 enforces differential privacy, an adversary cannot use the information in the DP responses 112 to determine whether any given data record falls within a particular quantile.

Data exploration involving rank statistics is useful in a wide variety of contexts. The rank statistics can be used in the process of building, training, and testing the machine-learned models described above and thus be incorporated into processes involving medical diagnoses and detecting exceptional transactions, to name but a few. For example, the rank statistics can be used to identify subsets of training data having particular properties (e.g., selecting records having values within particular quantiles as training data), to identify features of the training data on which to train (e.g., identifying the top 10% of discriminating features), and determining cutoff thresholds for classifiers.

Rank statistics can also be used in contexts outside of machine learning. In the medical context, rank statistics can be used to develop medical guidelines and therefore aid diagnoses. For example, rank statistics can be used to segment patient populations by age or gender in order to make a diagnosis or perform a particular medical test. In a specific example, rank statistics can be used to identify the median age of patients having a particular medical condition, and the median age can be incorporated into guidelines in order to evaluate the likelihood of a new patient having the condition. Rank statistics can also be used to segment populations. For example, rank statistics can be used to segment a group of people based on age, income, education, or other features and then deliver targeted messages to people within the particular groups. In a website analytics example, training data describing visitors to a website can be collected and used to create segmentation along one or more features. Messages can then be targeted to new visitors of the website based on the segments to which the new visitor belongs (e.g., visitors above and below a median age can receive different messages).

Returning to the discussion of FIG. 1, the differentially private security system 102 includes a user interface 150, a library 152, an account management system 154, a query handling engine 156, a data integration module 158, and a privacy system 160. Some embodiments of the differentially private security system 102 have different or additional modules than the ones described here. Similarly, the functions can be distributed among the modules in a different manner than is described here. Certain modules and functions can be incorporated into other modules of the differentially private security system 102.

The user interface 150 generates a graphical user interface on a dedicated hardware device of the differentially private security system 102 or the client 104 in which the client 104 can submit an analytical query 108 and the desired privacy parameters, view the DP response 112 in the form of numerical values or images, and/or perform other interactions with the system. The client 104 may also use the graphical user interface to inspect the database 106 schemata, view an associated privacy budget, cache the DP response 112 to view the response later, and/or perform administrative functions. The user interface 150 submits properly formatted query commands to other modules of the differentially private security system 102.

The library 152 contains software components that can be included in external programs that allow the client 104 to submit the analytical query 108, receive the DP response 112, and other functions within a script or program. For example, the client 104 may use the software components of the library 152 to construct custom data analytic programs. Each of the software components in the library 152 submits properly formatted query commands to other modules of the differentially private security system 102.

The account management system 154 receives properly formatted query commands (herein "query commands" or "QC"), parses the received query commands, and updates the account of the client 104 according to the received query command. For example, the account management system 154 may check the query commands for syntactic correctness, and/or check whether a client 104 has access to a requested resource. As another example, the account management system 154 may check whether the privacy parameters specified by the client 104 for a given analytical query 108 can be accommodated, and if so, decrement the privacy budget of the client 104 by the amount specified in the query 108. Query commands verified by the account management system 154 are provided to the query handling engine 156. Examples of query commands accommodated by the differentially private security system 102 are listed below.

QC1. Count
'SELECT COUNT (<column>) FROM <database.table> WHERE <where_clause> BUDGET <eps> <delta>.
QC2. Median
'SELECT MEDIAN (<column>) FROM <database.table> WHERE <where_clause> BUDGET <eps> <delta>.
QC3. Mean
'SELECT MEAN (<column>) FROM <database.table> WHERE <where_clause> BUDGET <eps> <delta>.
QC4. Variance
'SELECT VARIANCE (<column>) FROM <database.table> WHERE <where_clause> BUDGET <eps> <delta>.
QC5. Inter-Quartile Range
'SELECT IQR (<column>) FROM <database.table> WHERE <where_clause> BUDGET <eps> <delta>.
QC6. Batch Gradient Descent
'SELECT <GLM> (<columns_x>,<column_y>,<params>) FROM <database.table> WHERE <where_clause> BUDGET <eps> <delta>.
QC7. Stochastic Gradient Descent
'SELECT SGD <GLM> (<column>) FROM <database.table> WHERE <where_clause> BUDGET <eps> <delta>.
QC8. Random Forest
'SELECT RANDOMFOREST (<columns_x>,<columns_y>) FROM <database.table> WHERE <where_clause> BUDGET <eps> <delta>.
QC9. Histogram
'SELECT HISTOGRAM (<column>) FROM <database.table> WHERE <where_clause_i> BUDGET <eps> <delta>.

QC10. Rank Statistics
'SELECT RANKSTATISTIC (<column >) FROM <database.table> WHERE <where_clause>
BUDGET <eps><delta>.

The query handling engine 156 transforms the received query commands into appropriate function calls and database access commands by parsing the query command string. The function calls are specific to the query 108 requested by the client 104, and the access commands allow access to the required database 106. Different databases 106 require different access commands. The access commands are provided to the database integrator 158.

The database integrator 158 receives the access commands to one or more databases 106, collects the required databases, and merges them into a single data object. The data object has a structure similar to that of a database structure described in reference to FIG. 2. The data object is provided to the privacy system 160.

The privacy system 160 receives the data object from the database integrator 158, appropriate function calls from the query handling engine 156 indicating the type of query 108 submitted by the client 104, and privacy parameters specified for the query 108. The privacy system 160 evaluates the privacy parameters against the applicable privacy budget and either blocks or allows the query. If the query is blocked, the privacy system 160 may return a response to the client 104 indicating that the query did not execute. If the query is allowed, the privacy system 160 produces a DP response 112 to a differentially private version of the query 108 with respect to the databases 106. The privacy system 160 will be described in further detail in reference to FIG. 3 below.

FIG. 2 illustrates an example database structure, according to one embodiment. For the remainder of the application, a database, including one or more of the databases 106, may be referred to as a matrix with a number of rows and columns. Each row is an entry of the database and each column is a feature of the database. Thus, each row contains a data entry characterized by a series of feature values for the data entry. For example, as shown in FIG. 2, the example database 200 contains 8 entries and 11 features, and illustrates a list of patient profiles. Each patient is characterized by a series of feature values that contain information on the patient's height (Feature 1), country of residence (Feature 2), age (Feature 10), and whether the patient has contracted a disease (Feature 11). A row is also referred to as a "record" in the database 106.

The feature values may be numerical in nature, e.g., Features 1 and 10, or categorical in nature, e.g., Features 2 and 11. In the case of categorical feature values, each category may be denoted as an integer. For example, in Feature 11 of FIG. 2, "0" indicates that the patient has not contracted a disease, and "1" indicates that the patient has contracted a disease.

Privacy System

Figure 3:
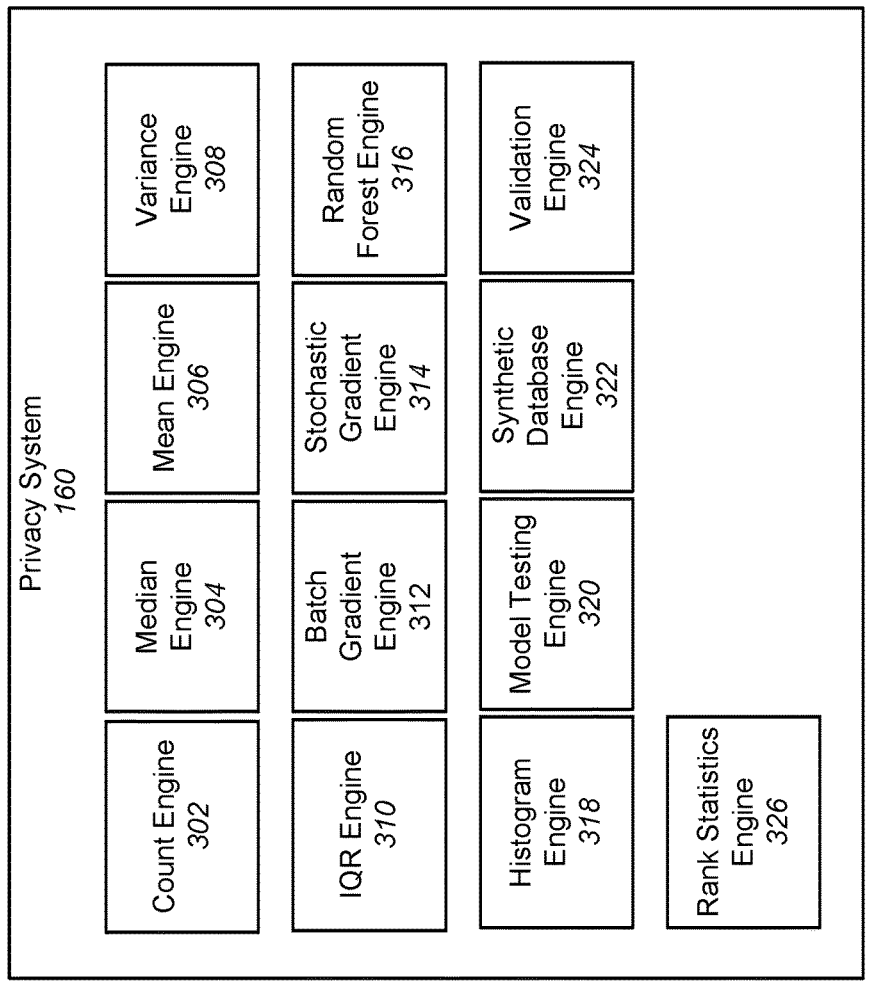
FIG. 3 is a block diagram illustrating the privacy system of the system in FIG. 1, according to one embodiment.

FIG. 3 is a block diagram illustrating the privacy system 160 of the system 100 shown in FIG. 1, according to one embodiment. The privacy system 160 includes a count engine 302, a mean engine 304, a median engine 306, a variance engine 308, an IQR engine 310, a batch gradient engine 312, a stochastic gradient engine 314, a random forest engine 316, a histogram engine 318, a model testing engine 320, a synthetic database engine 322, a validation engine 324, and a rank statistics engine 326. Some embodiments of the privacy system 160 have different or additional modules than the ones described here. Similarly, the functions can be distributed among the modules in a different manner than is described here. Certain modules and functions can be incorporated into other modules of the privacy system 160.

Definition of Differential Privacy

In one embodiment, for a given query 108, the privacy system 160 receives a data object X, function calls indicating the type of query 108, privacy parameters specified by the client 104, and outputs a DP response 112 to a differentially private version of the query 108 with respect to X. Each data object X is a collection of row vectors $x_{i=1, 2, \ldots, n}$, in which each row vector $x_i$ has a series of p elements $X_i^{j=1, 2, \ldots, p}$.

A query M satisfies the definition of E-differential privacy if for all:

$$\forall X, X' \in \mathbb{D}, \forall S \subseteq \text{Range}(M): \frac{Pr[M(X) \in S]}{Pr[M(X') \in S]} \leq e^{\varepsilon}$$

where $\mathbb{D}$ is the space of all possible data objects, X, X' neighboring data objects, S is an output space of query M, and neighboring databases are defined as two data objects X, X' that have at most one different entry from one another. That is, given two neighboring data objects X, X' in which one has an individual's data entry, and the other does not, there is no output of query M that an adversary can use to distinguish between X, X'. That is, an output of such a query M that is differentially private reveals no information about the data object X. The privacy parameter ε controls the amount of information that the query M reveals about any individual data entry in X, and represents the degree of information released about the entries in X. For example, in the definition given above, a small value of E indicates that the probability an output of query M will disclose information on a specific data entry is small, while a large value of ε indicates the opposite.

As another definition of differential privacy, a query M is (ε,δ)-differentially private if for neighboring data objects X, X':

$$\forall X, X' \in \mathbb{D}, \forall S \subseteq \text{Range}(M): \frac{Pr[M(X) \in S]}{Pr[M(X') \in S]} \leq e^{\varepsilon} + \delta.$$

The privacy parameter δ measures the improbability of the output of query M satisfying ε-differential privacy. As discussed in reference to FIG. 1, the client 104 may specify the desired values for the privacy parameters (ε,δ) for a query 108.

There are three important definitions for discussing the privacy system 160: global sensitivity, local sensitivity, and smooth sensitivity. Global sensitivity of a query M is defined as $$GS_M(X) = \max_{X, X': d(X, X')=1} \|M(X) - M(X')\|$$

where X, X' are any neighboring data objects, such that d(X, X')=1. This states that the global sensitivity is the most the output of query M could change by computing M on X and X'.

The local sensitivity of a query M on the data object X is given by:

$$LS_M(X) = \max_{X': d(X,X')=1} \|M(X) - M(X')\|$$

where the set $\{X': d(X, X')=1\}$ denotes all data objects that have at most one entry that is different from X. That is, the local sensitivity $LS_M(X)$ is the sensitivity of the output of the query M on data objects X' that have at most one different entry from X, measured by a norm function.

Related to the local sensitivity $LS_M(X)$, the smooth sensitivity given a parameter ft is given by:

$$S_M(X; \beta) = \max_{X' \in D} \|LS_M(X) \cdot e^{-\beta d(X,X')}\|$$

where d(X, X') denotes the number of entries that differ between X and X'.

Notation for Random Variables

The notation in this section is used for the remainder of the application to denote the following random variables.

1) $G(\sigma^2)$, denotes a zero-centered Gaussian random variable with the probability density function $$f(x|\sigma^2) = \frac{1}{\sigma\sqrt{2\pi}} e^{-\frac{x^2}{2\sigma^2}}.$$

2) L(b) denotes a zero-centered Laplacian random variable with the probability density function $$f(x|b) = \frac{1}{2b} e^{-\frac{|x|}{b}}.$$

3) $C(\gamma)$ denotes a zero-centered Cauchy random variable with the probability density function $$f(x|\gamma) = \frac{1}{\pi\gamma\left(1 + \left(\frac{x}{\gamma}\right)^2\right)}.$$

Further, a vector populated with random variables R as its elements is denoted by v(R). A matrix populated with random variables R as its elements is denoted by M(R).

Count Engine 302

The count engine 302 produces a DP response 112 responsive to the differentially private security system 102 receiving a query 108 for counting the number of entries in a column of the data object X that satisfy a condition specified by the client 104, given privacy parameters $(\varepsilon, \delta)$. An example query command for accessing the count engine 302 is given in QC1 above. For the example data object X shown in FIG. 2, the client 104 may submit a query 108 to return a DP response 112 for the number of patients that are above the age of 30.

The count engine 302 retrieves the count q from X. If privacy parameter $\delta$ is equal to zero, the count engine 302 returns $$y \approx q + L\left(c_1 \cdot \frac{1}{\varepsilon}\right),$$

as the DP response 112 for display on the user interface 150, where $c_1$ is a constant. An example value for $c_1$ may be 1. If the privacy parameter $\delta$ is non-zero, the count engine 302 returns $$y \approx q + G\left(c_1 \cdot 2 \cdot \log\frac{2}{\delta} \cdot \frac{1}{\varepsilon^2}\right),$$

as the DP response 112 for display on the user interface 150, where $c_1$ is a constant. An example value for $c_1$ may be 1.

Figure 4:
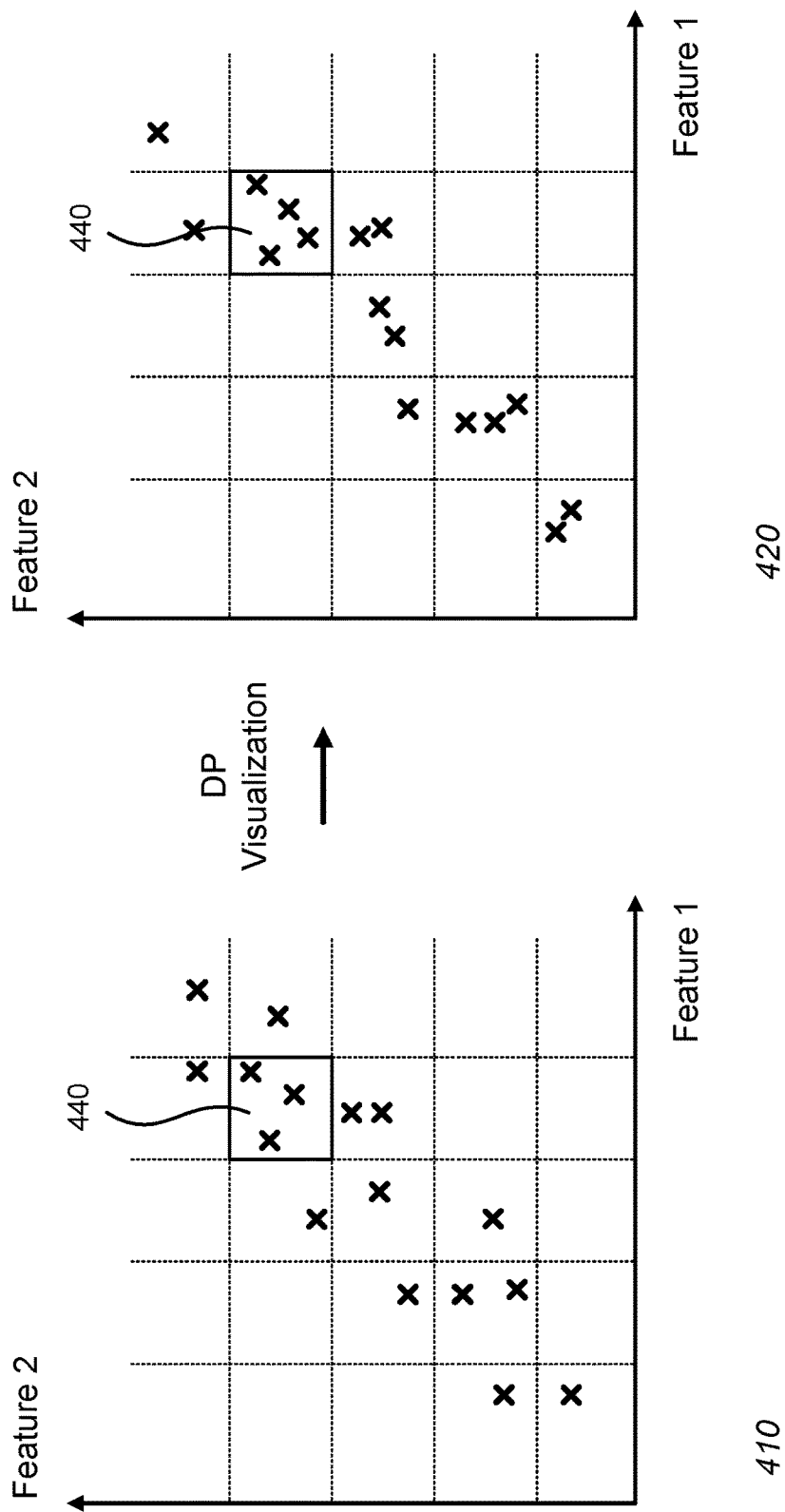
FIG. 4 illustrates displaying results of a differentially private count query, according to one embodiment.

The client 104 may request visualization of entries in the data object X for analysis of trends or patterns that depend on the features of the entries. In one embodiment, the privacy system 160 generates a differentially private visualization of the requested data entries from X. FIG. 4 illustrates displaying results of a differentially private count query to the user interface of the client, according to one embodiment.

The privacy system 160 first maps the requested entries from X for the selected features specified by the client 104. For example, as shown in the visualization 410 of FIG. 4, a series of requested entries are plotted depending on their values for Feature 1 and Feature 2. The privacy system 160 then generates disjoint regions on the plot and retrieves the counts of entries in each of the disjoint regions. In visualization 410, the privacy system 160 divides the plot into disjoint squares and retrieves the count of entries in each square.

For each disjoint region, the privacy system 160 submits a differentially private count query to the count engine 302, and randomly plots a number of entries determined by the DP response 112 of the count engine 302 for that region. The resulting DP visualization plot is returned to the client 104 for display to a user by the user interface 150. For example, square 440 in visualization 410 contains 3 entries, while the same square in DP visualization 420 contains 4 randomly plotted entries determined by the DP response 112 of the count engine 302.

Median Engine 304

The median engine 304 produces a DP response 112 responsive to the differentially private security system 102 receiving a query 108 for generating the median of entries in a column of the data object X that satisfy a condition specified by the client 104, given privacy parameters $(\varepsilon, \delta)$. An example query command for accessing the median engine 304 is given in QC2 above. For the example data object X shown in FIG. 2, the client 104 may submit a query 108 to return a DP response 112 for the median age of all patients in X.

The median engine 304 aggregates the values of entries satisfying the condition specified by the client 104 into a list U, and retrieves the median q from U. If privacy parameter $\delta$ is equal to zero, the median engine 304 returns $$y \approx q + c_1 \cdot S_M(U; c_2 \cdot \varepsilon) \cdot \frac{C(1)}{\varepsilon}$$

as the DP response 112 for display on the user interface 150, in which $c_1$, $c_2$ are constant factors. Example values for $c_1$, $c_2$ may be 6 and 1/6, respectively. If δ is non-zero, the median engine 304 returns $$y \approx q + c_1 \cdot S_M\left(U; c_2 \cdot \frac{\epsilon}{2 \cdot \log\frac{1}{\delta}}\right) \cdot \frac{L(1)}{\epsilon}$$

as the DP response 112 for display on the user interface 150. Example values for $c_1$, $c_2$ may be 2 and 1, respectively.

Mean Engine 306

The mean engine 306 produces a DP response 112 responsive to the differentially private security system 102 receiving a query 108 for generating the mean of entries in a column of the data object X that satisfy a condition specified by the client 104, given privacy parameters (ε,δ). An example query command for accessing the mean engine 306 is given in QC3 above. For the example data object X shown in FIG. 2, the client 104 may submit a query 108 to return a DP response 112 for generating the mean age of patients that are above the age of 30.

The mean engine 306 aggregates the values of entries satisfying the condition specified by the client 104 into a list U. Assuming there are n values in U, the mean engine 306 further divides U into m sub-lists $V_{j=1, 2, \ldots, m}$ each with n/m values. The mean engine 306 aggregates each mean $r_j$ of sub-list V into a list R. The mean engine 306 requests a differentially private median query of the values in R to the median engine 304. The resulting output from the median engine 304 is returned as the DP response 112 for display on the user interface 150.

Variance Engine 308

The variance engine 308 produces a DP response 112 responsive to the differentially private security system 102 receiving a query 108 for generating the variance of entries in a column of the data object X that satisfy a condition specified by the client 104, given privacy parameters (ε,δ). An example query command for accessing the variance engine 308 is given in QC4 above. For the example data object X shown in FIG. 2, the client 104 may submit a query 108 to return a DP response 112 for generating the variance of the age of all patients in X.

The variance engine 308 aggregates the values of entries satisfying the condition specified by the client 104 into a list U. Assuming there are n values in U, the variance engine 308 further divides U into m sub-lists $V_{j=1, 2, \ldots, m}$ each with n/m values. The variance engine 308 aggregates each variance $r_j$ of sub-list $V_j$ into a list R. The variance engine 308 requests a differentially private median query of the values in R to the median engine 304. The resulting output from the median engine 304 is returned as the DP response 112 for display on the user interface 150.

IQR Engine 310

The IQR engine 310 produces a DP response 112 responsive to the differentially private security system 102 receiving a query 108 for generating the interquartile range (IQR) of entries in a column of the data object X that satisfy a condition (ε,δ). An example query command for accessing the IQR engine 310 is given in QC5 above. For the example data object X shown in FIG. 2, the client 104 may submit a query 108 to return a DP response 112 for generating the IQR of the age of all patients in X.

In one embodiment, the IQR engine 310 aggregates the values of entries satisfying the condition specified by the client 104 into a list U. Assuming there are n values in U, the sample IQR of U is denoted as IQR(U), and a log transform of IQR(U) is denoted as:

$$H_n(U) = \log_{1+\frac{1}{\log n}} IQR(U).$$

The IQR engine 310 further maps the quantity $H_n(U)$ to an integer $k_0$ such that $H_n(U) \in [k_0, k_0+1)$. The IQR engine 310 extracts a value $A_0(U)$ indicating the number of entries in U required to change in order for the new list $\tilde{U}$ to satisfy $H_n(\tilde{U}) \notin [k_0, k_{0+1})$.

The IQR engine 310 then generates a value $R_0(U)$ given by:

$$R_0(U) \approx A_0(U) + L\left(\frac{c_1}{\epsilon}\right)$$

in which $c_1$ is a constant factor. If $R_0(U)$ is greater than a predetermined threshold, the IQR engine 310 returns $$y = IQR(U) \cdot \left(\frac{1}{1+\log n}\right)^{L\left(\frac{c_1}{\epsilon}\right)},$$

as the DP response 112 for display on the user interface 150. If $R_0(U)$ is equal to or less than the predetermined threshold, the IQR engine 310 returns "No Answer" as the DP response 112 for display on the user interface 150.

In another embodiment, the IQR engine 310 aggregates the values of entries satisfying the condition specified by the client 104 into an ordered list U. The IQR engine 310 retrieves the first quartile and the third quartile from U, given by q and q', respectively. If δ is zero, the IQR engine 310 returns:

$$y \approx \left(q + c_1 \cdot S_M(U; c_2 \cdot \epsilon) \cdot \frac{C(1)}{\frac{\epsilon}{2}}\right) - \left(q' + c_1 \cdot S_M(U; c_2 \cdot \epsilon) \cdot \frac{C(1)}{\epsilon/2}\right)$$

as the DP response 112 for display on the user interface 150, in which $c_1$, $c_2$ are constant factors.

If δ is non-zero, the IQR engine 310 returns:

$$y \approx \left(q + c_1 \cdot S_M\left(U; c_2 \cdot \frac{\epsilon}{2 \cdot \log\frac{1}{\delta}}\right) \cdot \frac{L(1)}{\frac{\epsilon}{2}}\right) - \left(q' + c_1 \cdot S_M\left(U; c_2 \cdot \frac{\epsilon}{2 \cdot \log\frac{1}{\delta}}\right) \cdot \frac{L(1)}{\epsilon/2}\right)$$

as the DP response 112 for display on the user interface 150, in which $c_1$, $c_2$ are constant factors.

Batch Gradient Engine 312

The batch gradient engine 312 produces a DP response 112 responsive to the differentially private security system 102 receiving a valid query 108 for generating a set of parameters θ for a general linear model that captures the correlation between a series of observable features and a dependent feature, given privacy parameters (ε,δ). The general linear model is trained on the selected columns of X. An example query command for accessing the batch gradient engine 312 is given in QC6 above.

Given a row vector x that contains a series of observable features and a label feature y, the correlation between the observable features and the label feature in a general linear model may be given as:

$$y = x\theta^T,$$

where θ is a row vector containing parameters of the model. That is, the label feature is modeled as a weighted sum of the observable features, where each value in θ is the weight given to a corresponding observable feature.

For the example data object X shown in FIG. 2, the client 104 may submit a query 108 to return a DP response 112 for generating a set of parameters θ for a general linear model that captures the correlation between the height of the patients (observable feature) and the age of the patients (label feature). As another example, the features may be categorical in nature, and the requested parameters θ may be for a general linear model that captures the correlation between the height, age, residence of the patients (observable features) and whether the patient will or has contracted a disease (label feature).

Examples of general linear models supported by the batch gradient engine 312 are, but not limited to, linear regression, logistic regression, and support vector machine (SVM) classifiers.

The optimal values for the set of parameters θ is found by training the general linear model on training data ($X_{train}$, $Y_{train}$) consisting of selected columns of data object X. Specifically, $X_{train}$ is a matrix database in which each column corresponds to a selected observable feature, and y is a column vector of the selected label feature values. Each entry in $X_{train}$ has a one-to-one correspondence with an entry in y. The optimal θ is generally found by minimizing a loss function on ($X_{train}$, $Y_{train}$) over possible values of θ. Mathematically, the minimization is given by:

$$\theta = \underset{\theta}{\operatorname{argmin}}\, \ell(X_{train}, y_{train}; \theta).$$

The batch gradient engine 312 returns a DP response 112 $\theta_{DP}$ of a differentially private batch gradient query by perturbing the loss function to be minimized. Specifically, the perturbed minimization is given by:

$$\theta_{DP} = \underset{\theta}{\operatorname{argmin}}\, \ell(X_{train}, y_{train}; \theta) + \theta^T v\left(G\left(\frac{4 \cdot K^2 \cdot R_2^2 \cdot \left(\log\frac{1}{\delta} + \epsilon\right)}{\epsilon^2}\right)\right),$$

in which K is the Lipschitz constant for loss function l(•). If j is the index of the columns in $X_{train}$, $x_i^j$ denotes the value of entry i and column j in $X_{train}$, and it is publicly known that for each column j, $a^j \leq x_i^j < b^j$, $R_2$ may be given by:

$$R_2 = \max(\|u\|_2 | a^j \leq u^j \leq b^j)$$

where u is a vector having elements $u^j$. The DP response 112 $\theta_{DP}$ may be provided for display on the user interface 150.

Stochastic Gradient Engine 314

Similarly to the batch gradient engine 312, the stochastic gradient engine 314 produces a DP response 112 responsive to the differentially private security system 102 receiving a valid query 108 for generating a set of parameters θ for a general linear model that captures the correlation between a series of observable features and a label feature, given privacy parameters (ε,δ). An example query command for accessing the stochastic gradient engine 314 is given in QC7 above.

Similar to the batch gradient engine 312, examples of general linear models supported by the stochastic gradient engine 314 are, but not limited to, linear regression, logistic regression, and support vector machine (SVM) classifiers.

The stochastic gradient engine 314 also minimizes a loss function on training data ($X_{train}$, $y_{train}$) over possible values of θ to find the optimal vales of parameter vector θ. However, the stochastic gradient engine 314 may minimize the loss function based on individual points or a subset of the training data, instead of the entire training data.

As discussed in reference to the batch gradient engine 312, a general minimization problem for finding the optimal values for θ over training data ($X_{train}$, $y_{train}$) is given by:

$$\theta = \underset{\theta}{\operatorname{argmin}}\, \ell(X_{train}, y_{train}; \theta)$$

where l(•) is a loss function. The minimization is solved by applying stochastic gradient descent on the loss function l(•) with respect to θ. This involves the steps of identifying an initial set of values for θ, calculating the gradient of the loss function with respect to θ, and updating θ based on the calculated gradient. The steps are repeated until the algorithm reaches convergence, and an optimal set of values for θ that minimize the loss function are identified.

Specifically, given the estimate for the parameter $\theta_t$ at time t, stochastic gradient descent generates a new estimate $\theta_{t+1}$ at the next time step t+1 by the following equation:

$$\theta_{t+1} = \theta_t - \eta_t \cdot n \cdot \nabla_{\theta_t} \ell(X_{train}, y_{train}; \theta),$$

in which $\nabla_\theta \ell(X_{train}, y_{train}; \theta)$ is the gradient of the loss function with respect to θ, and $\eta_t$ is the learning rate. The algorithm is repeated until the estimate for θ converges.

The stochastic gradient engine 314 returns a DP response 112 $\theta_{DP}$ of a differentially private stochastic gradient query by perturbing the update of θ at one or more time steps of the stochastic gradient descent algorithm. Specifically, a perturbed update at time t to t+1 is given by:

$$\theta_{t+1} = \theta_t - \eta_t \cdot n \cdot \nabla_{\theta_t} \ell(X_{train}, y_{train}; \theta) - \eta_t \cdot v\left(G\left(\frac{c_1^2 \cdot n^2 \cdot \left(\log\frac{n}{\delta} \cdot \log\frac{1}{\delta}\right)}{\epsilon^4}\right)\right),$$

where $\eta_t$ is the learning rate.

The stochastic gradient engine 314 may output the perturbed update at each time step as the DP response 112 for display on the user interface 150, or the converged parameter vector $\theta_{DP}$ as the DP response 112 for display on the user interface 150.

Random Forest Engine 316

The random forest engine 316 produces a DP response 112 responsive to the differentially private security system 102 receiving a valid query 108 for generating a trained random forest classifier that bins a series of feature values into one among multiple categories, given privacy parameters (ε,δ). The random forest classifier is trained on the selected columns of X. An example query command for accessing the random forest engine 316 is given in QC8 above. For the example data object X shown in FIG. 2, the client 104 may submit a query 108 to return a DP response 112 for generating a trained random forest classifier that receives values for the height and age of a patient and determines whether the patient has contracted the disease or not.

The random forest classifier, is trained on training data ($X_{train}$, $y_{train}$) to learn the correlation between the selected features of an entry and the category the entry belongs to. Specifically, $X_{train}$ is a matrix database in which each column corresponds to a selected feature of interest to the client 104, and y is a column vector of already known labels indicating the category of a corresponding entry. Each entry in $X_{train}$ has a one-to-one correspondence with a label entry in y. Upon being trained, the random forest classifier, or a classifier in general, receives a new data entry with selected feature values and generates an estimate of the category for the new entry.

The random forest classifier is an ensemble of individual binary decision tree classifiers, in which each binary decision tree generates an estimate for the category of an entry. Given a new data entry, the random forest classifier aggregates the category estimates from each binary decision tree and produces a final estimate for the category of the data entry.

Figure 5:
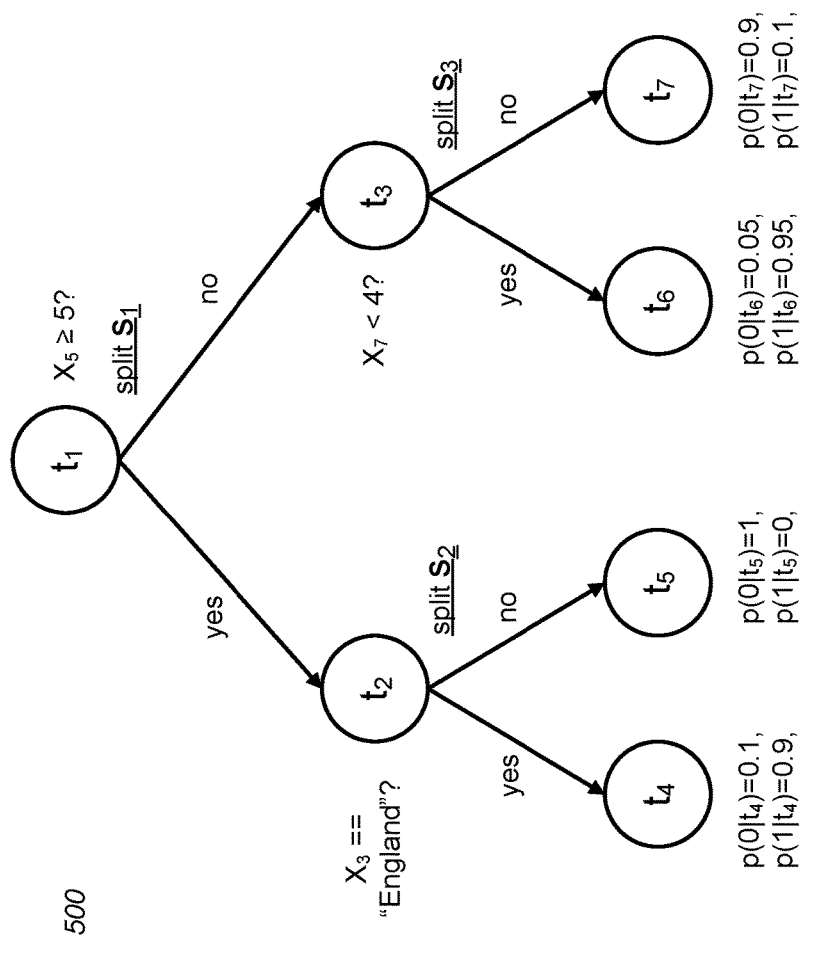
FIG. 5 illustrates an example binary decision tree for use in a differentially private random forest query, according to one embodiment.

FIG. 5 is an example diagram of a trained binary decision tree, according to one embodiment. Each decision tree includes a hierarchical structure with a plurality of T nodes $t_i=1, 2, \ldots, T$ and a plurality of directed edges between a parent node and a child node. A parent node is a node that has outgoing edges to a child node, and a child node is a node that receives edges from a parent node. In the particular embodiment of a binary decision tree, each parent node has two child nodes. The nodes are one among a root node, in which the node has no incoming edges, an internal node, in which the node has one incoming edge with two outgoing edges, and a leaf node, in which the node has one incoming edge with no outgoing edges. For example, the example decision tree in FIG. 5 has seven nodes $t1, t2, \ldots, t7$ and six edges. $t1$ is the root node, $t2$ and $t3$ are internal nodes, and $t4$-$t7$ are leaf nodes.

For each trained binary decision tree, each node except the root node corresponds to a partition of training data entries formed by a splits at a parent node. The splits at the parent node is based on a test condition of a feature of the training data ($X_{train}$, $y_{train}$) that compares the feature value of an entry to a reference value, and verifies whether the feature value meets that condition or not. Returning to the example shown in FIG. 5, node $t_1$ creates a split si into two child nodes $t_2$ and $t_3$ based on the test condition $x_5 \geq 5$, which checks if an entry contains a fifth feature value equal to or greater than 5. The training data ($X_{train}$, $y_{train}$) is thus split at si into one partition that contains entries with $x_5 \geq 5$, and another partition that contains entries with $x_5 < 5$. The former partition is directed to child node $t_1$ and the latter partition is directed to child node $t2$. The partitioning process is repeated until the leaf nodes of the binary decision tree are determined.

At the end of the training process, each leaf node is associated with a category that has a dominant proportion in the corresponding partition at the leaf node. In FIG. 5, leaf node $t4$ is assigned label "1," since the proportion of "1" labels in leaf node $t4$, denoted by $p(1|t4)$, is greater than the proportion of "0" labels in leaf node $t4$, denoted by $p(0|t4)$. Given a new data entry with an unknown category, the trained decision tree generates a label estimate by checking the appropriate feature values of the data entry at each node as it propagates through the tree to a destination leaf node. Upon arriving at the leaf node, the data entry is assigned the category label associated with the leaf node.

The random forest engine 316 returns a DP response 112 of a differentially private random forest query by perturbing the proportion of training data entries at leaf nodes of each trained binary decision tree. Specifically, the random forest engine 316 trains a random forest classifier T with an ensemble of $N_{trees}$ binary decision trees $B_{j=1, 2, \ldots, Ntrees}$ using training data ($X_{train}$, $y_{train}$) from the data object X. Assuming a binary classification problem with two labels "0" and "1," the random forest engine 316 perturbs the proportion of data entries associated with each category for each leaf node L. The perturbed proportion $p_{DP}(\bullet|t_L)$ is given by:

$$p_{DP}(0|t_L) \approx p(0|t_L) + L\left(\frac{\epsilon}{\log N_{trees}}\right),$$

$$p_{DP}(1|t_L) \approx p(1|t_L) + L\left(\frac{\epsilon}{\log N_{trees}}\right).$$

The random forest engine 316 returns the random forest classifier TDP containing an ensemble of perturbed binary decision trees $BDPj=1, 2, \ldots,$ Ntrees as the DP response 112. Moreover, the random forest engine 316 may display the perturbed proportion of data entries for leaf nodes of each binary decision tree $BDPj=1, 2, \ldots,$ Ntrees for display on the user interface 150.

Histogram Engine 318

The histogram engine 318 produces a DP response 112 responsive to the differentially private security system 102 receiving a query 108 for generating a histogram of a selected column in X, given privacy parameters ($\epsilon, \delta$). The histogram engine 318 creates one or more bins corresponding to one or more disjoint ranges of the selected feature values, and indicates the number or proportion of entries that belong to each bin. An example query command for accessing the histogram engine 318 is given in QC9 above. For the example data object X shown in FIG. 2, the client 104 may submit a query 108 to return a DP response 112 for generating a histogram of the age of all patients for bins age 0-10, 11-20, 21-30, and so on.

The histogram engine 318 returns a DP response 112 of a differentially private histogram query by perturbing the counts for each bin.

Figure 6:
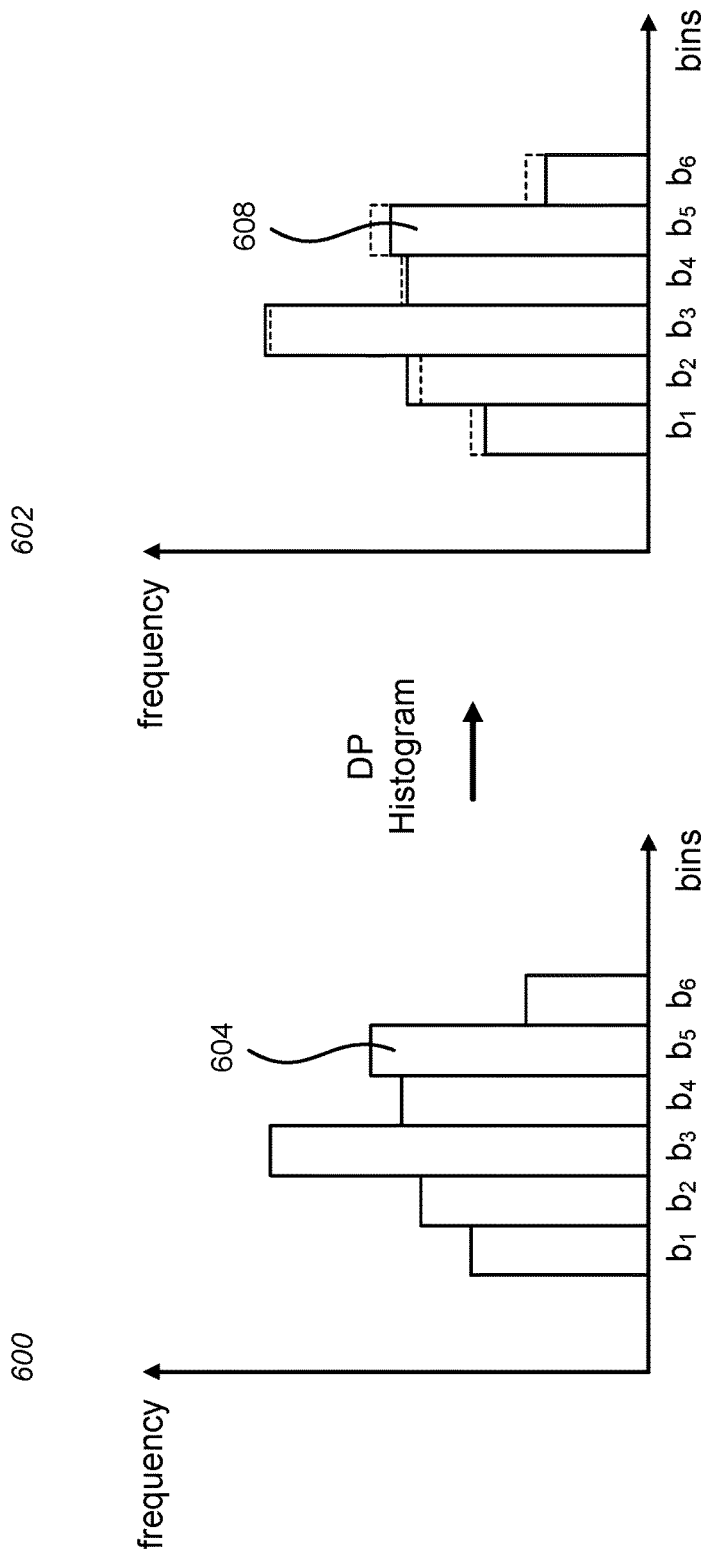
FIG. 6 illustrates perturbing the counts for a differentially private histogram query, according to one embodiment.

In one embodiment, the histogram engine 318 generates the requested histogram from the selected column of X, and perturbs the counts of each bin by submitting a request to the count engine 302. FIG. 6 illustrates perturbing the counts for a differentially private histogram query, according to one embodiment. As shown in FIG. 6, the histogram engine 318 generates histogram 600 by counting the number of entries corresponding to each bin $b_{i=1, 2, \ldots, B}$. The histogram engine 318 then requests the count engine 302 to perturb the counts $q_i$ for each bin to generate a perturbed histogram 602. As shown in FIG. 6, the count 608 for bin $b_5$ in the perturbed histogram 602 is a perturbed version of count 604 in the original histogram 600.

In another embodiment, the histogram engine 318 generates the requested histogram from the selected column of X, and perturbs the counts of each bin by decomposing the counts using a private wavelet decomposition algorithm. In such an embodiment, the histogram engine 318 aggregates the counts $q_{i=1, 2, \ldots, B}$ for each bin $b_{i=1, 2, \ldots, B}$ into a matrix (or vector) Q. The histogram engine 318 decomposes Q into a tree structure that is representative of a wavelet decomposition. Each leaf node of the tree corresponds to a count and each parent node of the tree corresponds to one of multiple wavelet coefficients $C_{j=1, 2, \ldots, m}$. The value of a wavelet coefficient $c_j$ is calculated based on the counts $q_i$ incorporated in the leaf nodes of the tree. This allows a count $q_i$ to be reconstructed as a function $f_i$ of the wavelet coefficients $c_{j=1, 2, \ldots, m}$. That is, for each count $q_i$:

$$q_i = f_i(c_0, c_1, \ldots, c_m).$$

The histogram engine 318 generates a perturbed histogram by perturbing the wavelet coefficients, and reconstructing the counts using the perturbed wavelet coefficients. Specifically, the perturbed wavelet coefficients $c^{DP}_{i=1, 2, \ldots, m}$ are given by:

$$c_i^{DP} = c_i + L\left(\frac{2^{l+1}}{\epsilon \cdot m}\right).$$

The reconstructed counts from the perturbed wavelet coefficients is now given by:

$$q_i^{DP} = f_i(c_0^{DP}, c_1^{DP}, \ldots, c_m^{DP}).$$

The histogram engine 318 outputs the perturbed histogram as the DP response 112 for display on the user interface 150.

In one embodiment, the histogram engine 318 may also be used to generate a differentially private visualization of data entries as described above in reference to the count engine 302 and FIG. 4. For example, the histogram module 318 may construct a multi-dimensional histogram corresponding to counts of the requested data entries in each region, perturb the histogram using mechanisms described above (e.g., private wavelet decomposition algorithm), and display the differentially private plot of the requested data entries on the user interface 150.

Model Testing Engine 320

The model testing engine 320 produces a DP response 112 responsive to the differentially private security system 102 receiving a query 108 for testing the performance of a classification model, given privacy parameters (ε,δ). The classification model is trained and tested on selected columns of X. As such, the model testing engine 320 may be appended to any other module that trains a classifier on X, such as the batch gradient engine 312, the stochastic gradient engine 314, or the random forest engine 316. For the example data object X shown in FIG. 2, the client 104 may submit a query 108 to return a DP response 112 for generating a performance evaluation of a support vector machine classifier that was trained using the stochastic gradient engine 314.

As discussed in reference to the random forest engine 316, classification models in general is trained on training data ($X_{train}$, $y_{train}$) to learn the correlation between selected features of an entry and the category the entry belongs to. The training data ($X_{train}$, $y_{train}$) may be extracted from a subset of entries contained in the data object X. Upon being trained, the classifier is able to receive a new data entry containing values for the selected features and generate an estimate of the category for the new entry.

Often times, the estimate of the category for an entry is determined by applying a cutoff threshold to a numerical, not categorical, output of a classifier. For example, in the random forest classifier described in reference to the random forest engine 316, the category associated with a leaf node $t_L$ is determined by the proportion of training data entries associated with each category, which is a numerical value. The random forest engine 316 may determine that a leaf node is associated with category "0" if the proportion of entries associated with label "0" is above a cutoff threshold of 0.5, 0.6, or 0.7. As another example, logistic regression classifiers output a numerical value in the range of [0, 1] given an entry of feature values. The entry may be classified into category "0" if the associated output is below a cutoff threshold of 0.5, 0.4, or 0.3. Regardless of the example, the cutoff threshold for determining the boundary between each category is a critical parameter depending on the context the classifier is applied to.

The model testing engine 320 receives a trained classifier and tests the performance of the trained classifier a series of cutoff thresholds, and generates a confusion matrix for each threshold indicating the performance of the classifier. The model testing engine 320 may test the performance of the classifier on testing data ($X_{test}$, $y_{test}$). Similarly to training data, $X_{test}$ contains a set of entries with selected feature values, and $y_{test}$ contains a vector of already known labels for each corresponding entry in $X_{test}$. However, in contrast to training data, testing data ($X_{test}$, $y_{test}$) comprises entries that are not present in training data ($X_{train}$, $y_{train}$). That is, testing data comprises entries that the classifier has not "seen" yet.

Figure 7A:
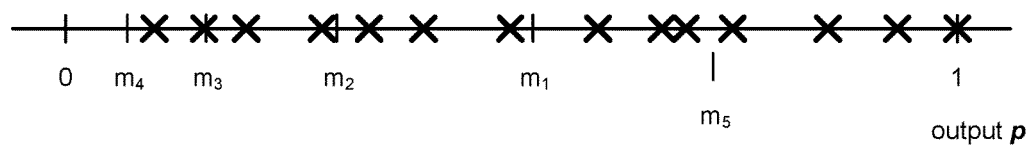
FIG. 7A illustrates a recursive process for identifying threshold points of the classification output vector for a differentially private model testing query, according to one embodiment.

The model testing engine 320 generates a series of cutoff thresholds based on the numerical values of p. FIG. 7A illustrates a recursive process for identifying threshold points of the classification output vector for the model testing engine 320, according to one embodiment. As shown in FIG. 7A, sample values of p are plotted on a range of 0 to 1. A series of k cutoff thresholds, or a series of intervals, are recursively identified by the median engine 304 such that the number of elements of p in each interval is approximately equal. Specifically, the median engine 304 recursively identifies the perturbed median for an interval and subsequently, its corresponding sub-intervals generated by dividing the interval by the identified perturbed median, until k thresholds are identified.

For example, as shown in FIG. 7, the median engine 304 identifies m1 as the perturbed median for the first interval [0, 1]. Subsequently, the median engine 304 identifies m2 as the perturbed median for the resulting sub-interval [0, m1], and m5 as the perturbed median for the sub-interval [m1, 1]. This process is repeated for sub-intervals [0, m2], [m2, m1], [m1, m5], [m5, 1] and for its sub-intervals until k thresholds, mi=1, 2, . . . , k are identified.

For each threshold $m_i$, the model testing engine 320 generates corresponding category label estimates from p, and compares the estimates to the vector of known labels $y_{test}$. Given the comparisons, the model testing engine 320 constructs a confusion matrix that evaluates the performance of the classifier.

Figure 7B:
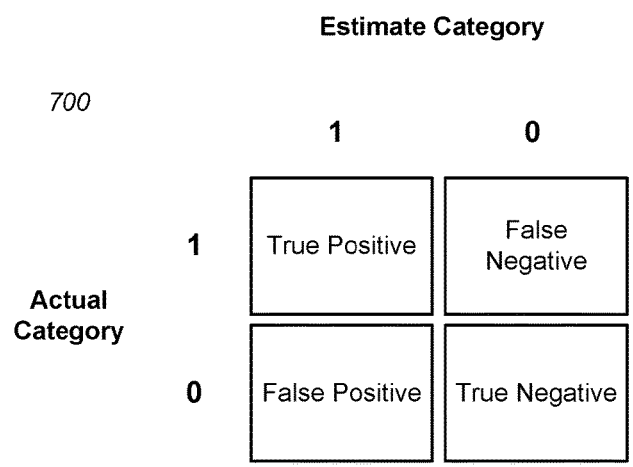
FIG. 7B illustrates an example confusion matrix generated during a differentially private model testing query.

FIG. 7B illustrates an example confusion matrix 700 generated by the model testing engine 320, according to one embodiment. As shown in FIG. 7B, the confusion matrix 700 contains the number of testing data entries for 4 categories: i) entries that have an actual category of "1" and an estimate category of "1" ("True Positive" entries), ii) entries that have an actual category of "0" and an estimate category of "0" ("True Negative" entries), iii) entries that have an actual category of "0" and an estimate category of "1" ("False Positive" entries), and iv) entries that have an actual category of "1" and an estimate category of "0" ("False Negative" entries). For a given threshold, a data entry only contributes to one among the 4 categories.

For each threshold $m_j$, the model testing engine 320 generates a perturbed confusion matrix by using the histogram engine 318. This is because each entry contributes to only one among the 4 disjoint categories, and thus, the entries in the confusion matrix 700 can be viewed as a histogram. The model testing engine 320 outputs each threshold $m_j$, and the corresponding perturbed confusion matrix as the DP response 112 for display on the user interface 150.

Synthetic Database Engine 322

The synthetic database engine 322 produces a DP response 112 responsive to the differentially private security system 102 receiving a query 108 for transforming X into a synthetic database S, given privacy parameters (ε,δ). The resulting synthetic database S has a number of entries corresponding to that in X, but a fewer number of columns or features than X. Moreover, the spatial relationship between a pair of entries in X is retained in S. The transformation of X to S is (ε,δ)-differentially private with respect to a neighboring data object X' with a 1-element difference from X.

The synthetic database engine 322 produces a DP response 112 of a differentially private synthetic database query by projecting the elements of X to S using a projection matrix. Assuming that data object X is a n×p matrix having n rows and p columns, the transformation by the synthetic database engine 322 is given by:

$$S = X * J\left(G\left(\frac{4 \cdot \log\delta}{n^2 \cdot \epsilon^2}\right)\right)$$

where J is a p×k projection matrix, with k<p. The resulting synthetic database matrix S is a n×k matrix containing equal number of entries or rows as data object matrix X, but containing a smaller number of features or columns than the original data object X.

As discussed above, the transformation using projection matrix J is (ε,δ)-differentially private. Moreover, the spatial relationship between a pair of entries in X is retained in S. That is, the distance between a pair of entries (xi,xj) in the p-dimensional feature space of X is approximately equal to the distance between a pair of entries (si,sj) in the k-dimensional feature space of S. The synthetic database engine 322 outputs S as the DP response 112 for display on the user interface 150.

Figure 8:
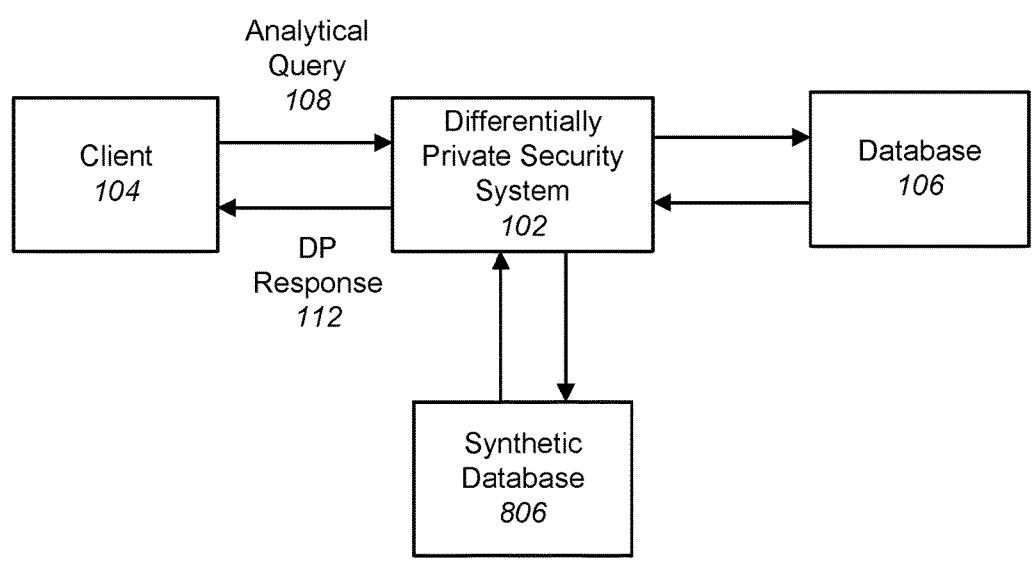
FIG. 8 illustrates a system-level modification to the system of FIG. 1 that allows the client to access to a differentially private synthetic database, according to one embodiment.

FIG. 8 is a modification 800 of the system 100 in FIG. 1 that allows the client 104 access to synthetic database 806 generated by the synthetic database engine 322, according to one embodiment. As shown in FIG. 8, the modified system 800 may allow the client 104 to access the synthetic database 806 generated by the synthetic database engine 322 through the differentially private security system 102. Since the transformation from X to S is (ε,δ)-differentially private, the privacy of X is retained.

Figure 9:
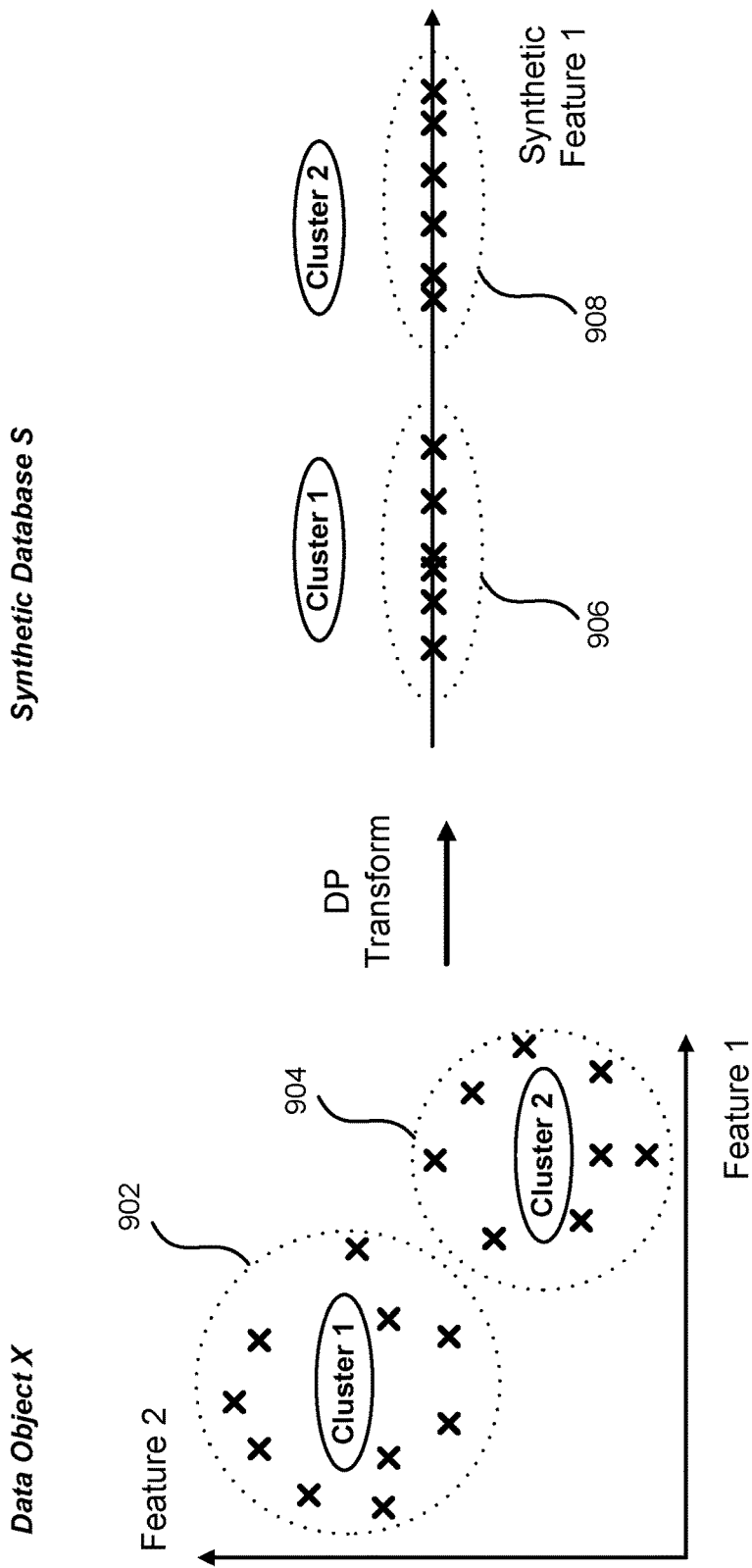
FIG. 9 illustrates the application of a clustering query to entries of a differentially private synthetic database, according to one embodiment.

FIG. 9 illustrates applying a clustering query to entries of the synthetic database, according to one embodiment. The various modules of the privacy system 160 and other analytical modules may be applied to the synthetic database 806 instead of the data object X to extract patterns or trends related to the information in X. The results of the analysis on the synthetic database 806 may also be provided for display on the user interface 150. For example, the client 104 may submit a clustering query on the entries of the synthetic database 806 using the batch gradient engine 312 or the stochastic gradient engine 314.

In the example of FIG. 9, clusters 902 and 904 are results of a non-differentially private clustering query on a data object X having two columns or features. Each cluster 902 and 904 are associated with a group of entries. Since the clustering query is not differentially private on X, the results of the query are not shown to the client 104. Clusters 906 and 908 are results of a non-differentially private clustering query on the synthetic database S having one column or feature due to the transformation by the synthetic database engine 322. Since the transformation preserves the spatial relationship between a pair of entries, cluster 906 is largely associated with the same entries in cluster 902, and cluster 908 is largely associated with the same entries in cluster 904. Since the synthetic database S is (ε,δ)-differentially private, the results of the clustering query may be displayed to the client 104 using the user interface 150.

Validation Engine 324

The validation engine 324 produces a DP response 112 responsive to the differentially private security system 102 receiving a request for whether a query 108 satisfies the definition of (ε,δ)-differential privacy for privacy parameters (ε,δ). In one embodiment, the validation engine 324 may receive a function call from the client 104 that points to the query 108. The query 108 may be, for example, an analytical model or an algorithm that can be applied to a data object X.

The validation engine 324 certifies whether the received query 108 satisfies the definition of (ε,δ)-differential privacy by applying the query 108 to example pairs of neighboring data objects (Z, Z'). Specifically, the validation engine 324 generates pairs of neighboring data objects (Z, Z'), having at most 1 entry different from each other. The validation engine 324 applies the received query 108 to each example pair of neighboring data objects (Z, Z') and determines whether an estimate of the quantity Pr[M(X)∈S]/Pr[M(X')∈S] satisfies the definition of (ε,δ)-differential privacy a sampling of outputs from S of the query M and over the randomness of the query M.

In one embodiment, the validation engine 324 may output a binary value to the client 104 as the DP response 112 for display on the user interface 150 that indicates whether or not the query 108 is (ε,δ)-differentially private. In some embodiments, the validation engine 324, in response to a determination that the query 108 is not (ε,δ)-differentially private, can reject or deny the query.

Figure 10:
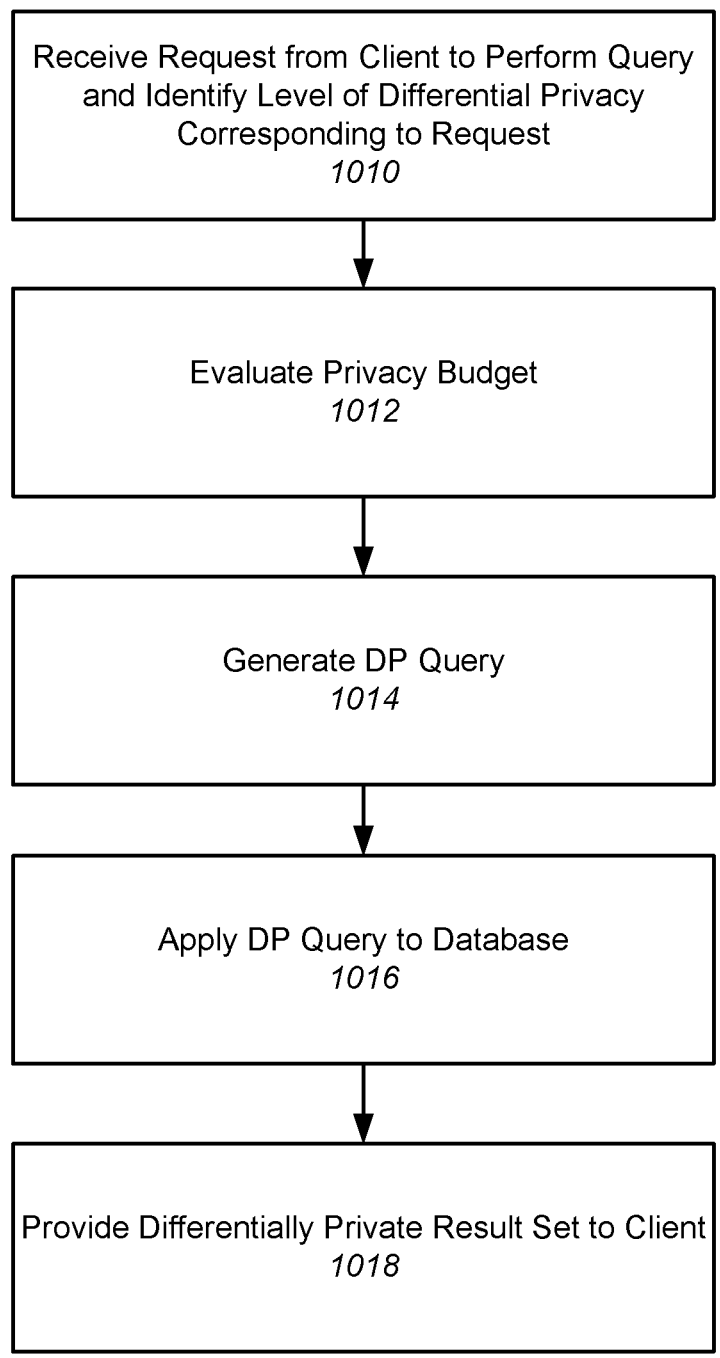
FIG. 10 illustrates a process for responding to a database query by executing a differentially private version of the query on the database, according to one embodiment.

FIG. 10 illustrates a process for responding to a database query by executing a differentially private version of the query on the database 106, according to one embodiment. A request from a client 104 to perform an analytical query 108 is received 1010 and a level of differential privacy corresponding to the request is identified. The requested level of differential privacy is evaluated 1012 against the privacy budget. The query 108 may be blocked if the requested level of differential privacy exceeds the privacy budget. Otherwise the query 108 is permitted. A DP query 114 is generated 1014 based on the received query 108. The DP query 114 is applied 1016 to restricted data in the database 106 to generate a DP response 112. The DP response is provided 118 to the client 104. An analyst associated with the client 104 may use the response for various purposes, such as for diagnosing a medical condition.

Figure 11:
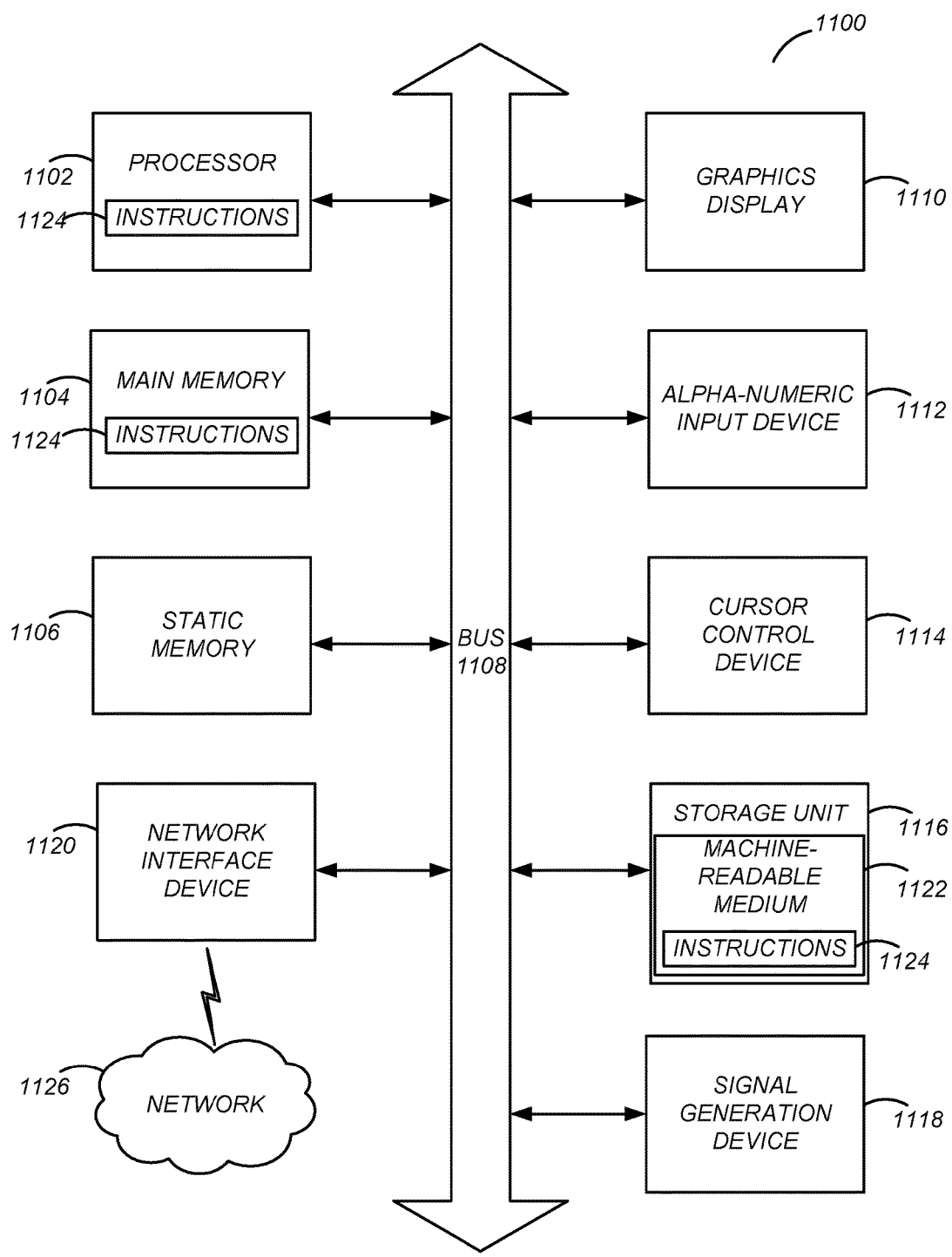
FIG. 11 is a block diagram illustrating components of an example machine able to read instructions from a machine-readable medium and execute them in a processor (or controller).

FIG. 11 is a block diagram illustrating components of an example machine able to read instructions from a machine-readable medium and execute them in a processor (or controller). Specifically, FIG. 11 shows a diagrammatic representation of a machine in the example form of a computer system 1100. The computer system 1100 can be used to execute instructions 1124 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes one or more processing units (generally processor 1102). The processor 1102 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1100 also includes a main memory 1104. The computer system may include a storage unit 1116. The processor 1102, memory 1104 and the storage unit 1116 communicate via a bus 1108.

In addition, the computer system 1106 can include a static memory 1106, a display driver 1110 (e.g., to drive a plasma display panel (PDP), a liquid crystal display (LCD), or a projector). The computer system 1100 may also include alphanumeric input device 1112 (e.g., a keyboard), a cursor control device 1114 (e.g., a mouse, a trackball, a joystick, a motion sensor, or other pointing instrument), a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium that is capable of storing instructions 1124 for execution by the machine and that cause the machine to perform any one or more of the methodologies disclosed herein. The term "machine-readable medium" includes, but not be limited to, data repositories in the form of solid-state memories, optical media, and magnetic media.

Rank Statistics Engine 326

Returning now to the privacy system 160, the rank statistics engine 326 produces a DP response 112 responsive to the differentially private security system 102 receiving a query 108 from the client 104 requesting identification of a value satisfying a rank statistic (e.g., a median or quantile) for the data object X, given privacy parameters ($\varepsilon,\delta$). An example query command for accessing the rank statistics engine 326 is given in QC10 above. In an embodiment, X is a set of values of a column of a set of records in the database 106. For example, X may be a set of 33 salaries recorded in a column of the database 106 and the query may request the value satisfying the $80^{th}$ percentile of X(e.g., the salary that is greater than 80% of other salaries in the set of salaries). The rank statistics engine 326 returns a differentially private version of the salary value in response to the query.

In one embodiment, the rank statistics engine 326 produces the DP response 112 containing the value satisfying the rank statistic using histogram-based operations on the restricted data. The rank statistic engine 326 generates a histogram for the values of X. The histogram places the values of X into a set of $N_b$ bins. In an embodiment, the rank statistics engine 326 determines $N_b$ based on a desired accuracy of the determined value and the width of the interval bounding the values in X(i.e., the domain of X). The desired accuracy may be determined from the rank statistic requested by the query, specifically from the quantile q. Specifically, the number of bins as computed as:

$$N_b = q|I_x|$$

where $N_b$ is the number of bins in the histogram, q is the requested quantile, and $|I_x|$ is the width of the domain. For example, q is four if the rank statistic is a quartile, and 100 if the rank statistic is a percentile. Note that this equation results in multiple bins for each quantile. For example, if the domain of X ranges from zero to four, and the requested quantile is a percentage, then $N_b$ is 5*100=500, resulting in five bins for each percentile.

Figure 12:
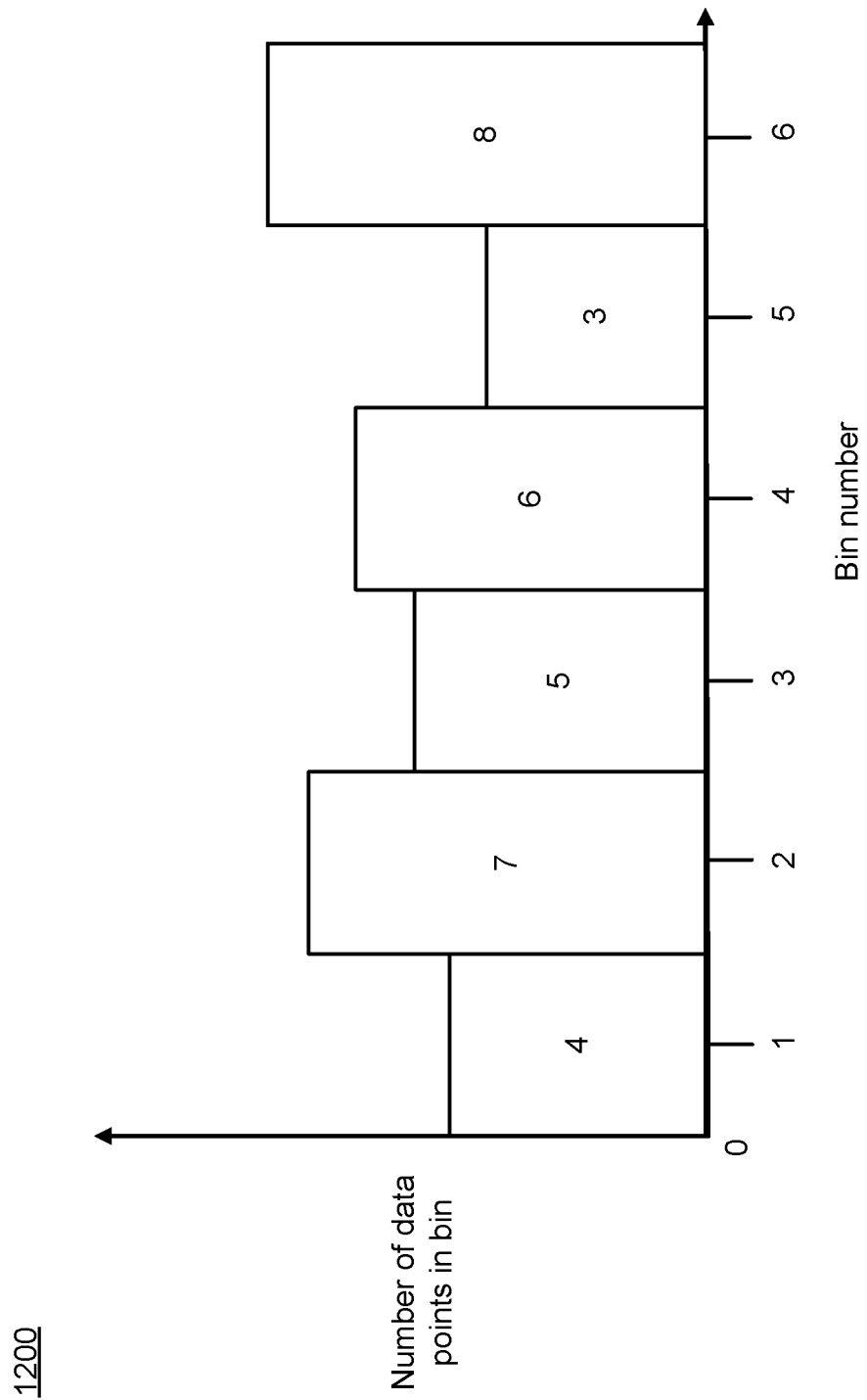
FIG. 12 illustrates an example histogram showing query results for use in providing differentially-private rank statistics, according to a first embodiment.

FIG. 12 illustrates an example histogram 1200 generated by the rank statistics engine 325 for the values of X The histogram 1200 bins 33 data points into six bins (bins 1-6) on the x-axis, which is represents the domain of the values of X while the y-axis is a range that indicates the number of data points in each bin. Bin 1 contains four data points, bin 2 contains seven data points, and so on. This histogram is computed exactly, with no privacy added.

The rank statistics engine 326 next assigns a weight to each bin of the histogram. The weight w for a bin B is determined by a weight equation:

$$w = \alpha \sum_{b \geq B} n_b d(b, B) + (1 - \alpha) \sum_{b \leq B} n_b d(b, B)$$

where a is the quantile specified by the query expressed as a value between 0 and 1 (e.g., the median is 0.5), B is the bin number of the bin for which the weight is being determined, b is a bin number other than B, $n_b$ is the number of values in bin b, and d(b,B) is the difference between the bin number b and the bin number B. For example, for bin 4 in FIG. 12, the weight is determined by:

$$0.5[4(1-4)+7(2-4)+5(3-4)]+(1-0.5)[3(4-5)+8(4-6)]$$

where a=0.5 (indicating the quantile specified in the query is 50%, i.e. the median), B=4 (the bin number of the bin for which the weight is being determined), b=(1, 2, 3, 5, 6) (each bin number other than B), $n_1$=4, $n_2$=7, $n_3$=5, $n_5$=3, and $n_6$=8 (each the number of binned values for a respective bin b). Furthermore, each d(b,B) is left in un-simplified form as a difference, such as d(1,4) as (1-4).

The above weight equation determines the weighted sum of distances to the points in the dataset represented in the histogram 1200, the minimization of which is a formulation of the $a^{th}$ quantile. For purposes of calculating the weight, the rank statistics engine 326 operates as if each binned data point is centered in its bin with respect to the x-axis. The bin that minimizes the equation is therefore the bin that contains the value satisfying the specified rank statistic (the $a^{th}$ quantile).

The rank statistics engine 325 provides differential privacy by selecting a bin from among the set of bins using the weights. In particular, the bin is selected using the exponential mechanism applied to a selection score calculated using the determined weights, the privacy parameters (e.g., ε, δ) associated with the query, and a sensitivity. In one embodiment, the exponential mechanism exp selects a given bin with probability proportional to:

$$\exp\left(\frac{\varepsilon * \text{weight}}{\text{sensitivity}}\right)$$

The sensitivity is determined by:

$$\frac{N_b - 1}{N_b} * |I_x| * \max(\alpha, 1-\alpha)$$

where wherein $N_b$ is a number of bins in the histogram, $|I_x|$ is the width of the domain X, and $\max(\alpha, 1-\alpha)$ is a maximum of $\alpha$ and $1-\alpha$.

This selection technique adds differential privacy by adding uncertainty as to whether the bin containing the value that actually satisfies the queried rank statistic is actually selected. The bin containing the actual value has the highest probability of being selected. However, there is a probabilistic chance that another bin will be selected instead.

Upon selection of a bin, which includes values within a sub-domain of the domain of X ranging from a lower bound of the bin to an upper bound of the bin, the rank statistics engine 326 selects a particular value from within the sub-domain of the selected bin as the differentially private value satisfying the requested rank statistic. In an embodiment, the particular value is selected according to:

$$B_{inf} + \alpha |B|$$

where $B_{inf}$ is the lower bound of the selected bin and $|B|$ is the width of the selected bin from the lower bound to the upper bound. In this manner a value situated $\alpha|B|$ into the bin is selected as the differentially private value satisfying the requested rank statistic. For example, continuing the salary example, if bin 1 is selected (with $B_{inf}$ equal to 0), $|B|$ is 20,000, and a is 0.1, the differentially private value is 0+0.1(20,000) which equals $2,000. In an embodiment, the determined value is returned to the client 104.

In an alternative embodiment, the rank statistics engine 326 uses the histogram engine 318 to generate a differentially private histogram as described above with reference to the histogram engine, and then determines an exact value satisfying the rank statistic using the differentially private histogram. For example, the rank statistics engine 326 may determine a value x minimizing the equation:

$$\alpha \sum_{z \in X, z \geq x} (z - x) + (1 - \alpha) \sum_{z \in X, z \leq x} (x - z)$$

where each z is a value in X as perturbed by the histogram engine 318. As such, the exact value determined may be returned as a differentially private result, due to the histogram itself being differentially private.

Figure 13:
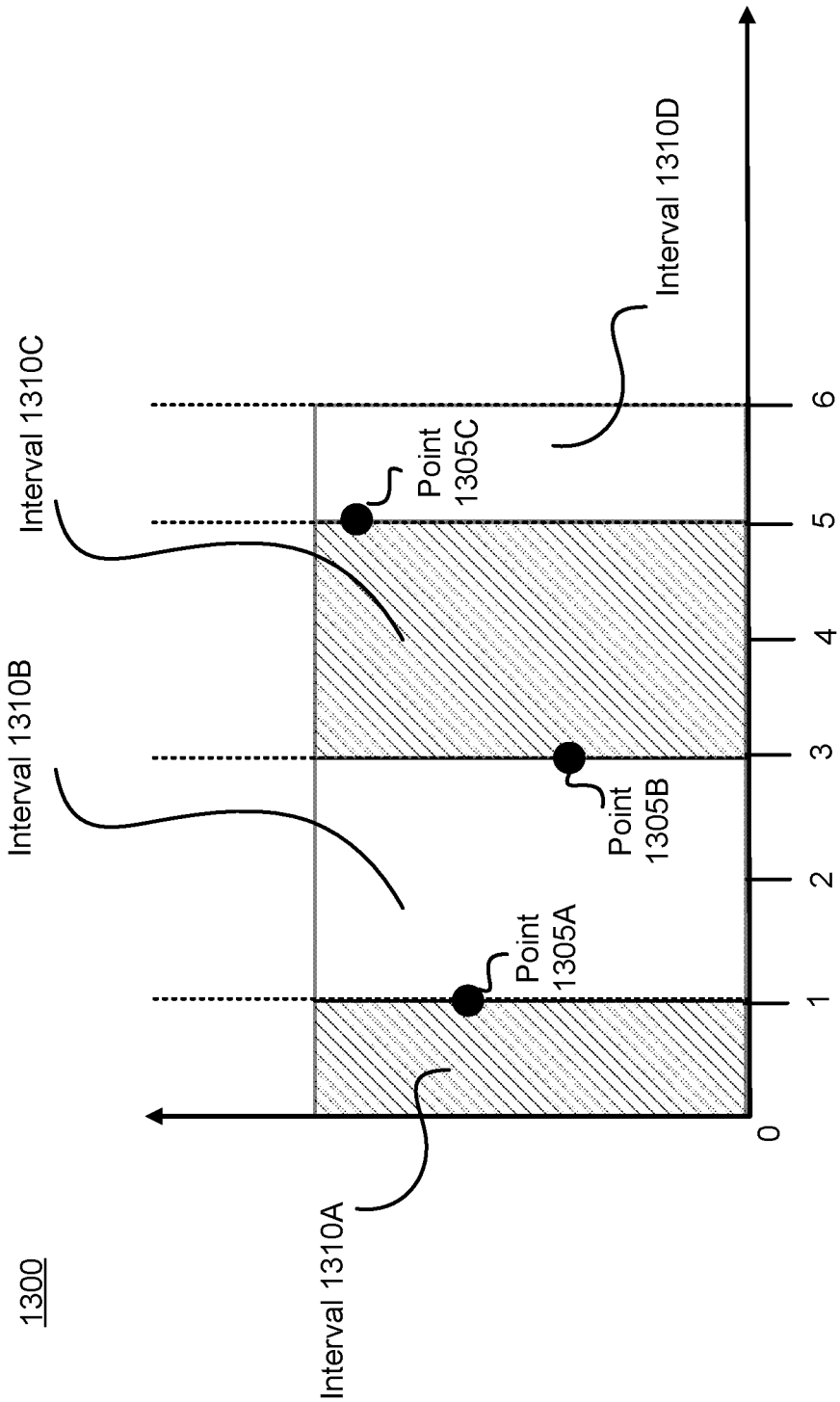
FIG. 13 illustrates an example histogram showing query results for use in providing differentially-private rank statistics, according to a second embodiment.

In addition, an embodiment of the rank statistics engine 326 uses a different technique to assign weights to the bins. FIG. 13 illustrates an example histogram 1300 for illustrating the technique of this embodiment. Here, the rank statistics engine 326 sorts the values of the column of the set of records in ascending order. For example, three values 3, 1, and 5 are sorted into a (1,3,5) order. This order is shown in the example histogram 1300 where point 1305A is at a "1" value along the x-axis, point 1305B is at a "3" value along the x-axis, and point 1305C is at a "5" value along the x-axis.

The rank statistics engine 326 bins the sorted values. Each bin is bound by an end of the domain and/or at least one of the sorted values. Furthermore, each bin is inclusive of at most one value, meaning that a bin not at the boundary of the domain extends from just past the prior value up to, and including, the subsequent value in the sorted order. In the example histogram 1300, interval 1310A is bounded by a lower end of the domain and by point 1305A, and is exclusive of point 1305A, interval 1310B is bounded by points 1305A and 1305B, and is inclusive of point 1305A, interval 1310C is bounded by points 1305B and 1305C and is inclusive of point 1305B, and interval 1310D is bounded by point 1305C and a higher end of the domain and is inclusive of both. Mathematically, these bins may be expressed as [0,1), [1,3), [3,5), and [5,6]. In other embodiments other techniques may be used to bin each value into its own bin. For example, in an alternative embodiment the initial interval 1310A is inclusive of point 1305A and the rest of the histogram adjusts accordingly. The rank statistics engine 326 assigns each bin a number representing its position in the sequence of bins. For example, interval 1310A may be bin 1, interval 1310B may be bin 2, and so on.

The rank statistics engine 326 determines a weight for each bin. In an embodiment, each bin is assigned a weight based on:

$$|I|\exp(-\varepsilon|i-\alpha n|)$$

where exp( ) is an exponential function, $|I|$ is width of the interval (bin) and i is bin number of the interval. $\alpha$ is again the rank statistic expressed as a value between 0 and 1.

Using these weights in an exponential mechanism such as the one described above causes the rank statistics engine 326 to select a bin in a differentially private manner. In one embodiment, the value binned in the selected bin is returned as the differentially private value satisfying the rank statistic. In other embodiments, an artificial value is selected from within the sub-domain of the selected bin, for example, using: $y \approx B_{inf} + \alpha |B|$.

In an embodiment, reservoir sampling is used as the weight of each bin is determined, where the rank statistics engine 326 keeps track of the bin with the greatest weight as each weight is determined. After each weight has been assigned, the bin with the greatest weight is sampled for a value, without prior selection of the bin by an exponential mechanism.

In a further embodiment, the rank statistics engine 326 supports queries requesting a differentially private rank statistic in terms of quantiles separated by powers of two (e.g., $1/2^k$-th quantile, $2/2^k$-th quantile . . . for a parameter k). These types of queries produce results useful for comparing two distributions, such as for q-q plots. In addition, the results can be used to build confusion curves for machine-learned model building and validation as described above, and also for dividing the data into bins containing roughly the same number of points in a differentially private manner.

Figure 14:
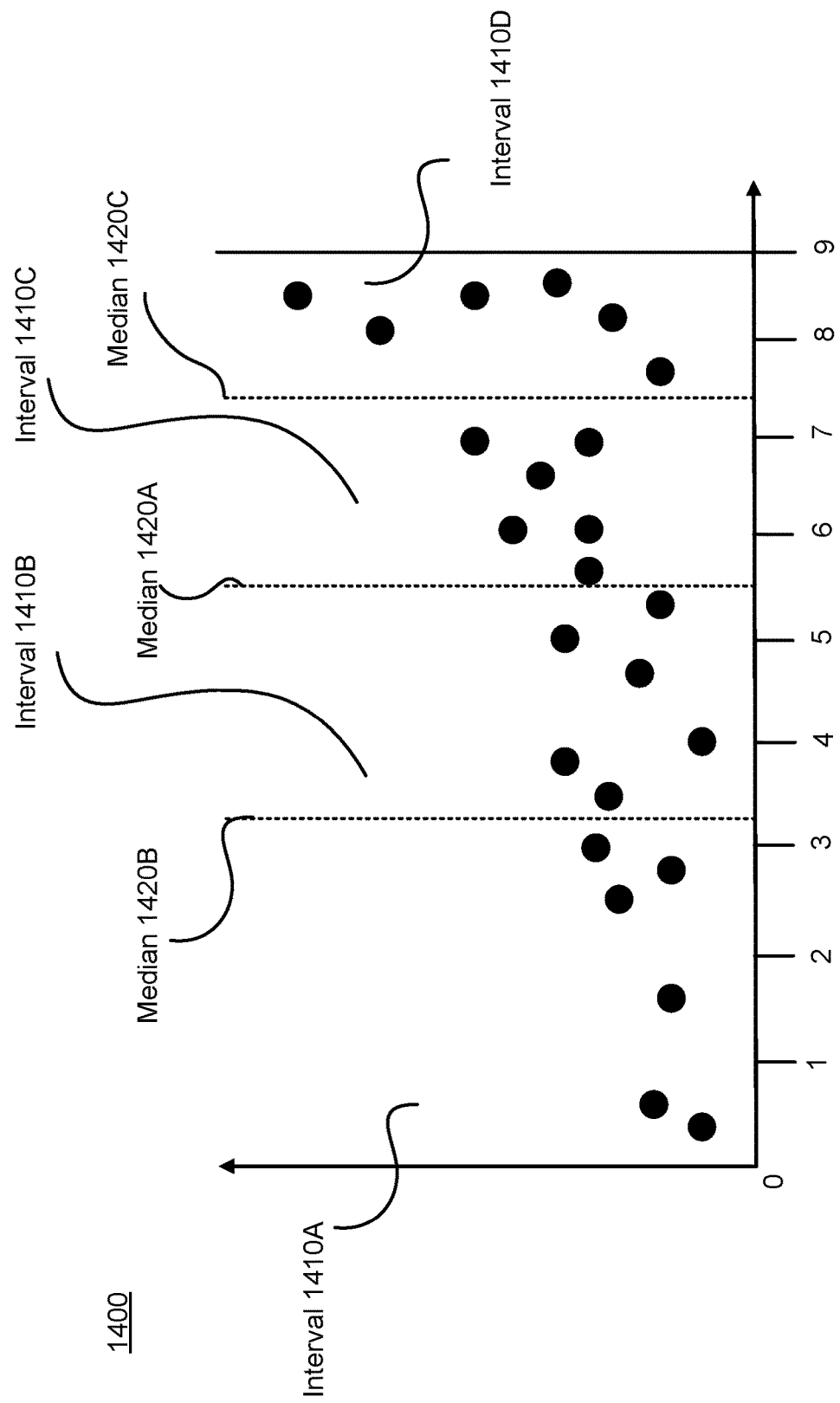
FIG. 14 illustrates an example graph showing query results for use in providing differentially-private k-recursive medians, according to one embodiment.

The technique for supporting these queries involves determining differentially private k-recursive medians. FIG. 14 illustrates an example graph 1400 useful for understanding k-recursive medians. The example graph 1400 includes 24 data points within a domain of (0,9). When performing k-recursive medians, the rank statistics engine 326 recursively determines "k" intervals of a set of data by splitting a domain or sub-domain at its differentially private median. In the example of the figure k=2 meaning 4 intervals of the domain are found. The recursion starts with the complete domain, then for each interval generated the rank statistics engine 326 performs the recursion k-1 more times, and so on.

Each median is determined by determining the value satisfying the $50^{th}$ percentile using one or more of the rank statistics techniques described above (e.g., with $\alpha=0.5$). For the example graph 1400, median 1420A is determined on the domain (0,9), as it is the point at which half the values on the domain are on either side. Median 1420A is approximately 5.5. As such it is used to form intervals to either side, e.g. [0, 5.5) and [5.5, 9].

The next level of the recursion acts upon each sub-interval. For [0, 5.5) the rank statistics engine 326 determines median 1420B at approximately 3.25 and for [5.5, 9] the rank statistics engine 326 determines median 1420C at approximately 7.4. Hence the domain is split into four intervals, those being intervals 14010A-D. Each interval created using k-recursive medians includes approximately the same number of values; in this example each interval includes 6 values. In an embodiment, each determined median is included in a set of medians and the set of medians is returned to the client 104 as the differentially private response to the query.

Figure 15:
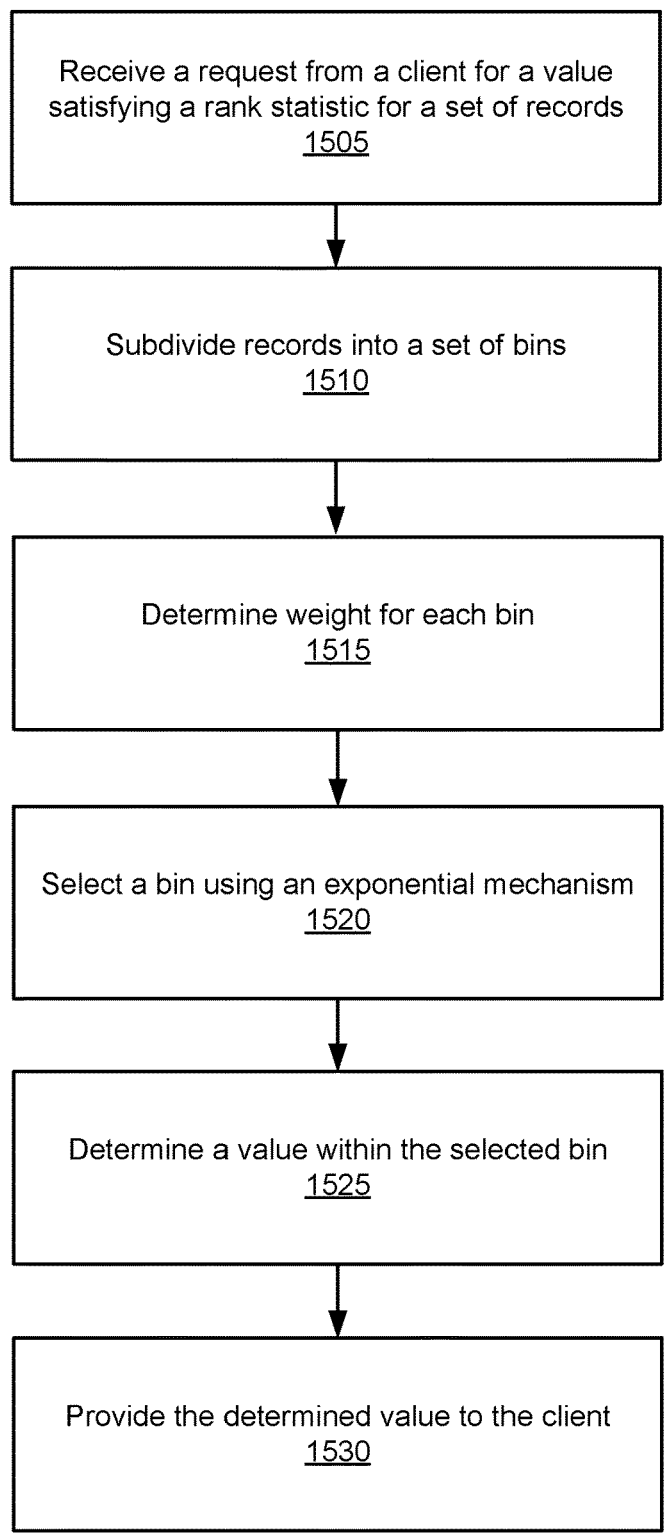
FIG. 15 is a flowchart illustrating a method for determining rank statistics, according to one embodiment.

FIG. 15 is a flowchart illustrating a method for determining rank statistics, according to one embodiment. The rank statistics engine 326 receives 1505 a request from a client 104 for a differentially private value satisfying a rank statistic for a set of records. The rank statistics engine 326 subdivides 1510 the set of records into a set of bins, such as a histogram. The rank statistics engine 326 determines 1515 a weight for each bin. A bin is then selected 1520 by the rank statistics engine 326 using the exponential mechanism based at least in part on the weights. The rank statistics engine 326 determines 1525 a value within the selected bin that satisfies the requested rank statistic. This value is differentially private. The rank statistics engine 326 then provides 1530 the determined differentially private value to the client 104.

Figure 16:
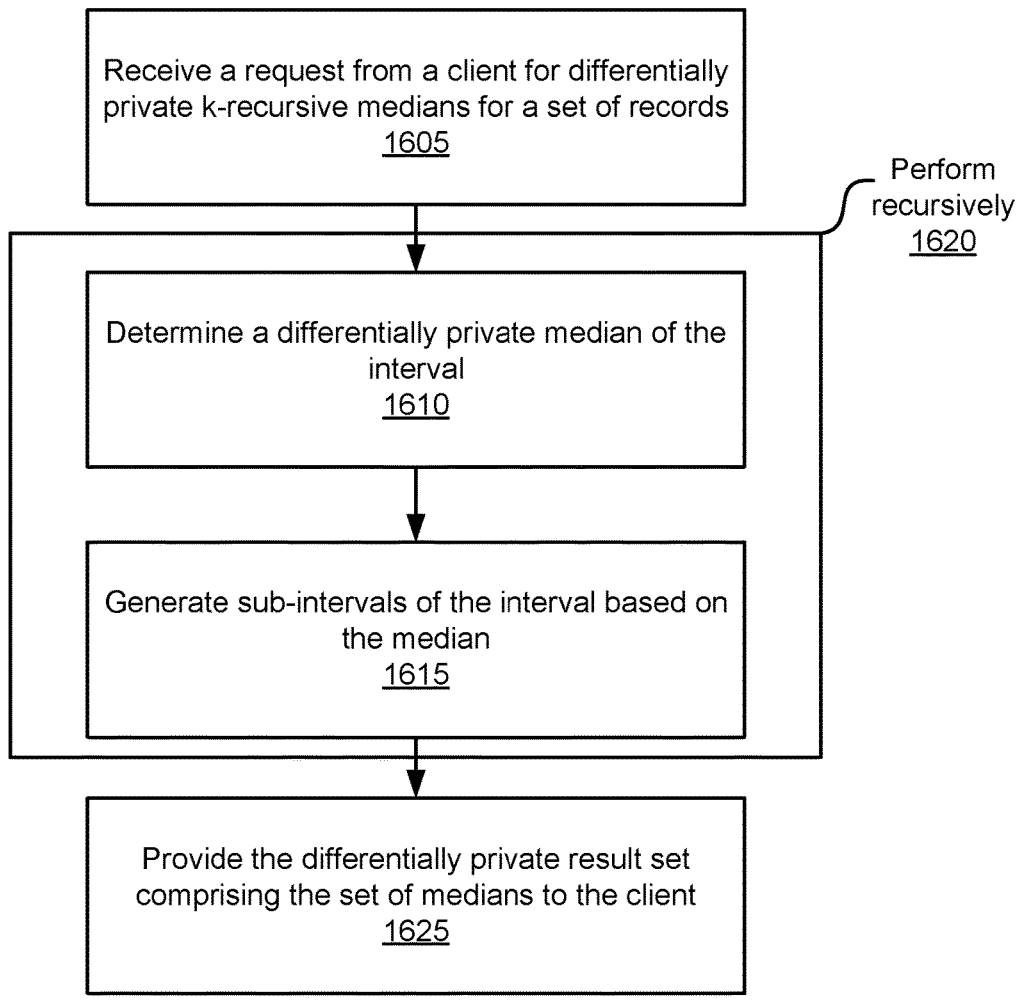
FIG. 16 is a flowchart illustrating a method for determining k-recursive medians, according to one embodiment.

FIG. 16 is a flowchart illustrating a method for determining k-recursive medians, according to one embodiment. The rank statistics engine 326 receives 1605 a request from a client 104 for differentially private k-recursive medians for a set of records that are on an interval. The rank statistics engine 326 determines 1610 a differentially private median of the set of records using a rank statistics technique. The rank statistics engine 326 generates 1615 sub-intervals of the interval based on the determined median. Determining 1610 and generating 1615 are repeated recursively 1620 upon the sub-intervals until k recursions have occurred. The rank statistics engine 326 provides 1625 the differentially private medians to the client 104, such as in a set of medians.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for receiving a query for a database, and responding to the query by executing a differentially private version of the query on the database. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A method for returning differentially private results in response to a query to a database storing restricted data, comprising:
   receiving a database query from a client device, the database query requesting a value satisfying a rank statistic based on a set of values of a column of a set of records storing restricted data in the database;
   performing the query on the set of records in the database to produce a differentially private version of the value satisfying the rank statistic, performing the query comprising:
      computing a histogram placing the values in the set of values into a plurality of bins, each bin containing any values in the set of values within a respective interval;
      assigning weights to the plurality of bins;
      selecting a bin of the plurality of bins responsive to the assigned weights; and
      computing a differentially private version of the value satisfying the rank statistic responsive to values within the respective interval for the selected bin; and
   returning the computed differentially private version of the value satisfying the rank statistic to the client device.

2. The method of claim 1, wherein the weight assigned to a given bin is based on a distance between the given bin and a true bin including the value satisfying the rank statistic.

3. The method of claim 1, wherein the rank statistic is specified by a quantile α of a plurality of quantiles, each bin of the plurality of bins has a respective bin number, and assigning weights to the plurality of bins comprises:
   determining a weight for each respective bin of the plurality of bins as:

$$\alpha \sum_{b \geq B} n_b d(b, B) + (1-\alpha) \sum_{b \leq B} n_b d(b, B)$$

wherein B is a bin number of the bin for which the weight is being determined, b is a bin number other than B, $n_b$ is a number of values of the set of values placed in b and d(b,B) is a difference between the bin number of b and the bin number of B.

4. The method of claim 3, wherein the database query specifies a privacy parameter ε describing a degree of information released about the set of values stored in the database due to the query, and selecting the bin responsive to the assigned weights comprises:
   assigning selection scores to the plurality of bins, the selection score assigned to the given bin determined responsive to the privacy parameter ε, the weight assigned to the given bin, and a sensitivity function:

$$\frac{N_b - 1}{N_b} * |I_x| * \max(\alpha, 1-\alpha)$$

wherein $N_b$ is a number of bins in the plurality of bins, $|I_x|$ is a width of an interval bounding the set of values, and max(α, 1−α) is a maximum of α and 1−α; and
   applying an exponential mechanism to the selection scores assigned to the bins of the plurality of bins; and
   selecting the bin responsive to the application of the exponential mechanism to the selection scores.

5. The method of claim 1, wherein the rank statistic is specified by a quantile α of a plurality of quantiles and computing the differentially private version of the value satisfying the rank statistic comprises:
   computing the differentially private version of the value satisfying the rank statistic as:

$B_{inf} + \alpha|B|$ wherein $B_{inf}$ is a lower bound of the selected bin and |B| is a width of the selected bin.

6. The method of claim 1, wherein the received query further identifies a level of accuracy, and further comprising:
   computing a number of bins in the plurality of bins responsive to the identified level of accuracy.

7. The method of claim 1, wherein the database query specifies the rank statistic as a quantile α of a plurality of quantiles and specifies a privacy parameter describing a degree of information released about the set of values stored in the database due to the query, and wherein computing the histogram comprises:
   computing bounding intervals for the bins of the plurality of bins such that each bin is bounded by two adjacent values of the set of values and includes one of the two adjacent values.

8. The method of claim 7, wherein each bin of the plurality of bins has a respective bin number i and:
   assigning weights to the plurality of bins comprises:
      determining a weight for each respective bin of the plurality of bins as:

$|I| \exp(-\varepsilon |i - \alpha n|)$ wherein |I| is a width of the respective bin, i is the bin number of the bin, and n is a number of values in the set of values; and
   selecting the bin of the plurality of bins responsive to the assigned weights comprises:
      applying an exponential mechanism to the weights assigned to the bins of the plurality of bins; and
      selecting the bin responsive to the application of the exponential mechanism to the weights.

9. The method of claim 8, wherein computing a differentially private version of the value satisfying the rank statistic comprises:
   selecting a value within the bounding interval of the selected bin.

10. A non-transitory computer-readable storage medium storing computer program instructions executable by a processor to perform operations for returning differentially private results in response to a query to a database storing restricted data, the operations comprising:
   receiving a database query from a client device, the database query requesting a value satisfying a rank statistic based on a set of values of a column of a set of records storing restricted data in the database;
   performing the query on the set of records in the database to produce a differentially private version of the value satisfying the rank statistic, performing the query comprising:
      computing a histogram placing the values in the set of values into a plurality of bins, each bin containing any values in the set of values within a respective interval;
      assigning weights to the plurality of bins;
      selecting a bin of the plurality of bins responsive to the assigned weights; and computing a differentially private version of the value satisfying the rank statistic responsive to values within the respective interval for the selected bin; and returning the computed differentially private version of the value satisfying the rank statistic to the client device.

11. The non-transitory computer-readable storage medium of claim 10, wherein the weight assigned to a given bin is based on a distance between the given bin and a true bin including the value satisfying the rank statistic.

12. The non-transitory computer-readable storage medium of claim 10, wherein the rank statistic is specified by a quantile $\alpha$ of a plurality of quantiles, each bin of the plurality of bins has a respective bin number, and assigning weights to the plurality of bins comprises:

determining a weight for each respective bin of the plurality of bins as:

$$\alpha \sum_{b \geq B} n_b d(b, B) + (1-\alpha) \sum_{b \leq B} n_b d(b, B)$$

wherein B is a bin number of the bin for which the weight is being determined, b is a bin number other than B, $n_b$ is a number of values of the set of values placed in b and d(b,B) is a difference between the bin number of b and the bin number of B.

13. The non-transitory computer-readable storage medium of claim 12, wherein the database query specifies a privacy parameter $\epsilon$ describing a degree of information released about the set of values stored in the database due to the query, and selecting the bin responsive to the assigned weights comprises:

assigning selection scores to the plurality of bins, the selection score assigned to the given bin determined responsive to the privacy parameter $\epsilon$, the weight assigned to the given bin, and a sensitivity function:

$$\frac{N_b - 1}{N_b} * |I_x| * \max(\alpha, 1-\alpha)$$

wherein $N_b$ is a number of bins in the plurality of bins, $|I_x|$ is a width of an interval bounding the set of values, and max($\alpha$, 1–$\alpha$) is a maximum of $\alpha$ and 1–$\alpha$; and applying an exponential mechanism to the selection scores assigned to the bins of the plurality of bins; and
selecting the bin responsive to the application of the exponential mechanism to the selection scores.

14. The non-transitory computer-readable storage medium of claim 10, wherein the rank statistic is specified by a quantile $\alpha$ of a plurality of quantiles and computing the differentially private version of the value satisfying the rank statistic comprises:

computing the differentially private version of the value satisfying the rank statistic as:

$$B_{inf} + \alpha |B|$$

wherein $B_{inf}$ is a lower bound of the selected bin and $|B|$ is a width of the selected bin.

15. The non-transitory computer-readable storage medium of claim 10, wherein the received query further identifies a level of accuracy, and the operations further comprise:

computing a number of bins in the plurality of bins responsive to the identified level of accuracy.

16. The non-transitory computer-readable storage medium of claim 10, wherein the database query specifies the rank statistic as a quantile $\alpha$ of a plurality of quantiles and specifies a privacy parameter $\epsilon$ describing a degree of information released about the set of values stored in the database due to the query, and wherein computing the histogram comprises:

computing bounding intervals for the bins of the plurality of bins such that each bin is bounded by two adjacent values of the set of values and includes one of the two adjacent values.

17. The non-transitory computer-readable storage medium of claim 16, wherein each bin of the plurality of bins has a respective bin number i and:

assigning weights to the plurality of bins comprises:
determining a weight for each respective bin of the plurality of bins as:

$$|I| \exp(-\epsilon |i - \alpha n|)$$

wherein $|I|$ is a width of the respective bin, i is the bin number of the bin, and n is a number of values in the set of values; and selecting the bin of the plurality of bins responsive to the assigned weights comprises:
applying an exponential mechanism to the weights assigned to the bins of the plurality of bins; and
selecting the bin responsive to the application of the exponential mechanism to the weights.

18. The non-transitory computer-readable storage medium of claim 17, wherein computing a differentially private version of the value satisfying the rank statistic comprises:

selecting a value within the bounding interval of the selected bin.

19. A method for returning differentially private results in response to a query to a database storing restricted data, comprising:

receiving a database query from a client device, the database query requesting a differentially private subset of records from a set of records in the database, the records in the set having a column with values defining a bounded interval, the requested subset of records having values of the column within a specified range of the bounded interval;

performing the query on the set of records in the database to produce a differentially private result set of records based on the requested subset, performing the query comprising:

using a differentially-private rank statistic technique to determine an initial differentially private median value within the bounded interval for the column;
subdividing the bounded interval into sub-intervals bounded by the initial median value;
recursively generating additional differentially private median values based on the sub-intervals; and
identifying a differentially private subset of records responsive to the additional median values; and returning the identified differentially private subset of the records to the client device.

* * * * *